US012724401B2

(12) United States Patent
Guo et al.

(10) Patent No.: US 12,724,401 B2
(45) Date of Patent: Sep. 1, 2026

(54) RADIO FREQUENCY IMPEDANCE MATCHING NETWORK WITH FLEXIBLE TUNING ALGORITHMS

(71) Applicant: Applied Materials, Inc., Santa Clara, CA (US)

(72) Inventors: Yue Guo, Redwood City, CA (US); Kartik Ramaswamy, San Jose, CA (US); Jie Yu, Santa Clara, CA (US); Yang Yang, San Diego, CA (US); Farhad Moghadam, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 540 days.

(21) Appl. No.: 17/980,378

(22) Filed: Nov. 3, 2022

(65) Prior Publication Data

US 2024/0152114 A1 May 9, 2024

(51) Int. Cl.
*G05B 19/414* (2006.01)
*G05B 19/18* (2006.01)

(52) U.S. Cl.
CPC ....... *G05B 19/4145* (2013.01); *G05B 19/182* (2013.01); *G05B 2219/45031* (2013.01)

(58) Field of Classification Search
CPC .............. G05B 19/4145; G05B 19/182; G05B 2219/45031; G05B 19/4065; G05B 2219/37124; H01J 37/32183; H01J 37/32917; H01J 37/32926; H01J 37/32174; H01J 37/244; H01J 2237/334;
(Continued)

(56) References Cited

U.S. PATENT DOCUMENTS 4,070,589 A 1/1978 Martinkovic
4,340,462 A 7/1982 Koch
(Continued)

FOREIGN PATENT DOCUMENTS

CN 101990353 A 3/2011
CN 102084024 A 6/2011
(Continued)

OTHER PUBLICATIONS

Google AI, "Performance data", 2026, pp. 3, downloaded from https://www.google.com/search?q=performance+data&safe=active&sca_esvhttps://www.google.com/search?q=performance+data&safe=active&sca_esv (Year: 2026).*
(Continued)

*Primary Examiner* — Robert E Fennema
*Assistant Examiner* — Olvin Lopez Alvarez
(74) *Attorney, Agent, or Firm* — Patterson + Sheridan, LLP

(57) ABSTRACT

Embodiments provided herein generally include apparatus and methods, controlled by flexible tuning algorithms, for generating a plasma in a plasma processing chamber. Flexible communications between equipment of the plasma processing system allows sharing of process information and equipment settings for evaluation and refinement of the tuning algorithms used. This enhances the productivity of batch processing of a plurality of semiconductor wafers during the manufacturing process since the tuning algorithms can be modified on the fly during processing thereof. The tuning algorithms may be recorded, reused and/or modified for controlling future plasma processing.

19 Claims, 9 Drawing Sheets

(58) Field of Classification Search
CPC ........... H01J 2237/3321; H01J 37/3299; H01J 37/32944; H01L 21/67253; H01L 22/20; H01L 21/67069; C23C 16/505; C23C 16/52; C23C 16/509; A61B 2562/0223; B60W 2450/50; Y02A 90/244
See application file for complete search history.

(56) References Cited

U.S. PATENT DOCUMENTS 4,464,223 A 8/1984 Gorin
4,504,895 A 3/1985 Steigerwald
4,585,516 A 4/1986 Corn et al.
4,683,529 A 7/1987 Bucher, II
4,931,135 A 6/1990 Horiuchi et al.
4,992,919 A 2/1991 Lee et al.
5,099,697 A 3/1992 Agar
5,140,510 A 8/1992 Myers
5,242,561 A 9/1993 Sato
5,449,410 A 9/1995 Chang et al.
5,451,846 A 9/1995 Peterson et al.
5,464,499 A 11/1995 Moslehi et al.
5,554,959 A 9/1996 Tang
5,565,036 A 10/1996 Westendorp et al.
5,595,627 A 1/1997 Inazawa et al.
5,597,438 A 1/1997 Grewal et al.
5,610,452 A 3/1997 Shimer et al.
5,698,062 A 12/1997 Sakamoto et al.
5,716,534 A 2/1998 Tsuchiya et al.
5,770,023 A 6/1998 Sellers
5,796,598 A 8/1998 Nowak et al.
5,810,982 A 9/1998 Sellers
5,830,330 A 11/1998 Lantsman
5,882,424 A 3/1999 Taylor et al.
5,928,963 A 7/1999 Koshiishi
5,933,314 A 8/1999 Lambson et al.
5,935,373 A 8/1999 Koshimizu
5,948,704 A 9/1999 Benjamin et al.
5,997,687 A 12/1999 Koshimizu
6,043,607 A 3/2000 Roderick
6,051,114 A 4/2000 Yao et al.
6,055,150 A 4/2000 Clinton et al.
6,074,518 A 6/2000 Imafuku et al.
6,089,181 A 7/2000 Suemasa et al.
6,099,697 A 8/2000 Hausmann
6,110,287 A 8/2000 Arai et al.
6,117,279 A 9/2000 Smolanoff et al.
6,125,025 A 9/2000 Howald et al.
6,133,557 A 10/2000 Kawanabe et al.
6,136,387 A 10/2000 Koizumi
6,187,685 B1 2/2001 Hopkins et al.
6,197,151 B1 3/2001 Kaji et al.
6,198,616 B1 3/2001 Dahimene et al.
6,201,208 B1 3/2001 Wendt et al.
6,214,162 B1 4/2001 Koshimizu
6,232,236 B1 5/2001 Shan et al.
6,252,354 B1 * 6/2001 Collins ............ H01J 37/32174 156/345.28
6,253,704 B1 7/2001 Savas
6,277,506 B1 8/2001 Okamoto
6,309,978 B1 10/2001 Donohoe et al.
6,313,583 B1 11/2001 Arita et al.
6,355,992 B1 3/2002 Via
6,358,573 B1 3/2002 Raoux et al.
6,367,413 B1 4/2002 Sill et al.
6,392,187 B1 5/2002 Johnson
6,395,641 B2 5/2002 Savas
6,413,358 B2 7/2002 Donohoe
6,423,192 B1 7/2002 Wada et al.
6,433,297 B1 8/2002 Kojima et al.
6,435,131 B1 8/2002 Koizumi
6,451,389 B1 9/2002 Amann et al.
6,456,010 B2 9/2002 Yamakoshi et al.
6,483,731 B1 11/2002 Isurin et al.
6,535,785 B2 3/2003 Johnson et al.
6,621,674 B1 9/2003 Zahringer et al.
6,664,739 B1 12/2003 Kishinevsky et al.
6,733,624 B2 5/2004 Koshiishi et al.
6,740,842 B2 5/2004 Johnson et al.
6,741,446 B2 5/2004 Ennis
6,751,510 B1 * 6/2004 Tan ....................... G05B 11/42 318/609
6,777,037 B2 8/2004 Sumiya et al.
6,808,607 B2 10/2004 Christie
6,818,103 B1 11/2004 Scholl et al.
6,818,257 B2 11/2004 Amann et al.
6,830,595 B2 12/2004 Reynolds, III
6,830,650 B2 12/2004 Roche et al.
6,849,154 B2 2/2005 Nagahata et al.
6,861,373 B2 3/2005 Aoki et al.
6,863,020 B2 3/2005 Mitrovic et al.
6,896,775 B2 5/2005 Chistyakov
6,902,646 B2 6/2005 Mahoney et al.
6,917,204 B2 7/2005 Mitrovic et al.
6,947,300 B2 9/2005 Pai et al.
6,962,664 B2 11/2005 Mitrovic
6,970,042 B2 11/2005 Glueck
6,972,524 B1 12/2005 Marakhtanov et al.
7,016,620 B2 3/2006 Maess et al.
7,046,088 B2 5/2006 Ziegler
7,059,267 B2 6/2006 Hedberg et al.
7,104,217 B2 9/2006 Himori et al.
7,115,185 B1 10/2006 Gonzalez et al.
7,126,808 B2 10/2006 Koo et al.
7,147,759 B2 12/2006 Chistyakov
7,151,242 B2 12/2006 Schuler
7,166,233 B2 1/2007 Johnson et al.
7,183,177 B2 2/2007 Al-Bayati et al.
7,206,189 B2 4/2007 Reynolds, III
7,218,503 B2 5/2007 Howald
7,218,872 B2 5/2007 Shimomura
7,226,868 B2 6/2007 Mosden et al.
7,265,963 B2 9/2007 Hirose
7,274,266 B2 9/2007 Kirchmeier
7,305,311 B2 12/2007 van Zyl
7,312,974 B2 12/2007 Kuchimachi
7,408,329 B2 8/2008 Wiedemuth et al.
7,415,940 B2 8/2008 Koshimizu et al.
7,440,301 B2 10/2008 Kirchmeier et al.
7,452,443 B2 11/2008 Gluck et al.
7,479,712 B2 1/2009 Richert et al.
7,509,105 B2 3/2009 Ziegler
7,512,387 B2 3/2009 Glueck
7,535,688 B2 5/2009 Yokouchi et al.
7,586,099 B2 9/2009 Eyhorn et al.
7,586,210 B2 9/2009 Wiedemuth et al.
7,588,667 B2 9/2009 Cerio, Jr.
7,601,246 B2 10/2009 Kim et al.
7,609,740 B2 10/2009 Glueck
7,618,686 B2 11/2009 Colpo et al.
7,633,319 B2 12/2009 Arai
7,645,341 B2 1/2010 Kennedy et al.
7,651,586 B2 1/2010 Moriya et al.
7,652,901 B2 1/2010 Kirchmeier et al.
7,692,936 B2 4/2010 Richter
7,700,474 B2 4/2010 Cerio, Jr.
7,705,676 B2 4/2010 Kirchmeier et al.
7,706,907 B2 4/2010 Hiroki
7,718,538 B2 5/2010 Kim et al.
7,740,704 B2 6/2010 Strang
7,758,764 B2 7/2010 Dhindsa et al.
7,761,247 B2 7/2010 van Zyl
7,782,100 B2 8/2010 Steuber et al.
7,791,912 B2 9/2010 Walde
7,795,817 B2 9/2010 Nitschke
7,801,635 B2 * 9/2010 Funk ............... G05B 19/41865 700/121
7,808,184 B2 10/2010 Chistyakov
7,821,767 B2 10/2010 Fujii
7,825,719 B2 11/2010 Roberg et al.
7,858,533 B2 12/2010 Liu et al.
7,888,240 B2 2/2011 Hamamjy et al.
7,898,238 B2 3/2011 Wiedemuth et al.
7,929,261 B2 4/2011 Wiedemuth
RE42,362 E 5/2011 Schuler

(56) References Cited

U.S. PATENT DOCUMENTS 7,977,256 B2 7/2011 Liu et al.
7,988,816 B2 8/2011 Koshiishi et al.
7,995,313 B2 8/2011 Nitschke
8,044,595 B2 10/2011 Nitschke
8,052,798 B2 11/2011 Moriya et al.
8,055,203 B2 11/2011 Choueiry et al.
8,083,961 B2 12/2011 Chen et al.
8,110,992 B2 2/2012 Nitschke
8,128,831 B2 3/2012 Sato et al.
8,129,653 B2 3/2012 Kirchmeier et al.
8,133,347 B2 3/2012 Gluck et al.
8,133,359 B2 3/2012 Nauman et al.
8,140,292 B2 3/2012 Wendt
8,217,299 B2 7/2012 Ilic et al.
8,221,582 B2 7/2012 Patrick et al.
8,236,109 B2 8/2012 Moriya et al.
8,284,580 B2 10/2012 Wilson
8,313,612 B2 11/2012 McMillin et al.
8,313,664 B2 11/2012 Chen et al.
8,333,114 B2 12/2012 Hayashi
8,361,906 B2 1/2013 Lee et al.
8,382,999 B2 2/2013 Agarwal et al.
8,383,001 B2 2/2013 Mochiki et al.
8,384,403 B2 2/2013 Zollner et al.
8,391,025 B2 3/2013 Walde et al.
8,399,366 B1 3/2013 Takaba
8,419,959 B2 4/2013 Bettencourt et al.
8,422,193 B2 4/2013 Tao et al.
8,441,772 B2 5/2013 Yoshikawa et al.
8,456,220 B2 6/2013 Thome et al.
8,460,567 B2 6/2013 Chen
8,466,622 B2 6/2013 Knaus
8,542,076 B2 9/2013 Maier
8,551,289 B2 10/2013 Nishimura et al.
8,568,606 B2 10/2013 Ohse et al.
8,603,293 B2 12/2013 Koshiishi et al.
8,632,537 B2 1/2014 McNall, III et al.
8,641,916 B2 2/2014 Yatsuda et al.
8,685,267 B2 4/2014 Yatsuda et al.
8,704,607 B2 4/2014 Yuzurihara et al.
8,716,114 B2 5/2014 Ohmi et al.
8,716,984 B2 5/2014 Mueller et al.
8,735,291 B2 5/2014 Ranjan et al.
8,796,933 B2 8/2014 Hermanns
8,809,199 B2 8/2014 Nishizuka
8,821,684 B2 9/2014 Ui et al.
8,828,883 B2 9/2014 Rueger
8,845,810 B2 9/2014 Hwang
8,852,347 B2 10/2014 Lee et al.
8,884,523 B2 11/2014 Winterhalter et al.
8,884,525 B2 11/2014 Hoffman et al.
8,889,534 B1 11/2014 Ventzek et al.
8,895,942 B2 11/2014 Liu et al.
8,907,259 B2 12/2014 Kasai et al.
8,916,056 B2 12/2014 Koo et al.
8,926,850 B2 1/2015 Singh et al.
8,963,377 B2 2/2015 Ziemba et al.
8,979,842 B2 3/2015 McNall, III et al.
8,993,943 B2 3/2015 Pohl et al.
9,011,636 B2 4/2015 Ashida
9,039,871 B2 5/2015 Nauman et al.
9,042,121 B2 5/2015 Walde et al.
9,053,908 B2 6/2015 Sriraman et al.
9,059,178 B2 6/2015 Matsumoto et al.
9,087,798 B2 7/2015 Ohtake et al.
9,101,038 B2 8/2015 Singh et al.
9,105,447 B2 8/2015 Brouk et al.
9,105,452 B2 8/2015 Jeon et al.
9,123,762 B2 9/2015 Lin et al.
9,129,776 B2 9/2015 Finley et al.
9,139,910 B2 9/2015 Lee et al.
9,147,555 B2 9/2015 Richter
9,150,960 B2 10/2015 Nauman et al.
9,159,575 B2 10/2015 Ranjan et al.
9,208,992 B2 12/2015 Brouk et al.
9,209,032 B2 12/2015 Zhao et al.
9,209,034 B2 12/2015 Kitamura et al.
9,210,790 B2 12/2015 Hoffman et al.
9,224,579 B2 12/2015 Finley et al.
9,226,380 B2 12/2015 Finley
9,228,878 B2 1/2016 Haw et al.
9,254,168 B2 2/2016 Palanker
9,263,241 B2 2/2016 Larson et al.
9,287,086 B2 3/2016 Brouk et al.
9,287,092 B2 3/2016 Brouk et al.
9,287,098 B2 3/2016 Finley
9,306,533 B1 4/2016 Mavretic
9,309,594 B2 4/2016 Hoffman et al.
9,313,872 B2 4/2016 Yamazawa et al.
9,355,822 B2 5/2016 Yamada et al.
9,362,089 B2 6/2016 Brouk et al.
9,373,521 B2 6/2016 Mochiki et al.
9,384,992 B2 7/2016 Narishige et al.
9,396,960 B2 7/2016 Ogawa et al.
9,404,176 B2 8/2016 Parkhe et al.
9,412,613 B2 8/2016 Manna et al.
9,435,029 B2 9/2016 Brouk et al.
9,483,066 B2 11/2016 Finley
9,490,107 B2 11/2016 Kim et al.
9,495,563 B2 11/2016 Ziemba et al.
9,496,150 B2 11/2016 Mochiki et al.
9,503,006 B2 11/2016 Pohl et al.
9,520,269 B2 12/2016 Finley et al.
9,530,667 B2 12/2016 Rastogi et al.
9,536,713 B2 1/2017 Van Zyl et al.
9,544,987 B2 1/2017 Mueller et al.
9,558,917 B2 1/2017 Finley et al.
9,564,287 B2 2/2017 Ohse et al.
9,570,313 B2 2/2017 Ranjan et al.
9,576,810 B2 2/2017 Deshmukh et al.
9,576,816 B2 2/2017 Rastogi et al.
9,577,516 B1 2/2017 Van Zyl
9,583,357 B1 2/2017 Long et al.
9,593,421 B2 3/2017 Baek et al.
9,601,283 B2 3/2017 Ziemba et al.
9,601,319 B1 3/2017 Bravo et al.
9,607,843 B2 3/2017 Rastogi et al.
9,620,340 B2 4/2017 Finley
9,620,376 B2 4/2017 Kamp et al.
9,620,987 B2 4/2017 Alexander et al.
9,637,814 B2 5/2017 Bugyi et al.
9,644,221 B2 5/2017 Kanamori et al.
9,651,957 B1 5/2017 Finley
9,655,221 B2 5/2017 Ziemba et al.
9,663,858 B2 5/2017 Nagami et al.
9,666,446 B2 5/2017 Tominaga et al.
9,666,447 B2 5/2017 Rastogi et al.
9,673,027 B2 6/2017 Yamamoto et al.
9,673,059 B2 6/2017 Raley et al.
9,685,297 B2 6/2017 Carter et al.
9,706,630 B2 7/2017 Miller et al.
9,711,331 B2 7/2017 Mueller et al.
9,711,335 B2 7/2017 Christie
9,728,429 B2 8/2017 Ricci et al.
9,734,992 B2 8/2017 Yamada et al.
9,741,544 B2 8/2017 Van Zyl
9,754,768 B2 9/2017 Yamada et al.
9,761,419 B2 9/2017 Nagami
9,761,459 B2 9/2017 Long et al.
9,767,988 B2 9/2017 Brouk et al.
9,786,503 B2 10/2017 Raley et al.
9,799,494 B2 10/2017 Chen et al.
9,805,916 B2 10/2017 Konno et al.
9,805,965 B2 10/2017 Sadjadi et al.
9,812,305 B2 11/2017 Pelleymounter
9,831,064 B2 11/2017 Konno et al.
9,837,285 B2 12/2017 Tomura et al.
9,840,770 B2 12/2017 Klimczak et al.
9,852,889 B1 12/2017 Kellogg et al.
9,852,890 B2 12/2017 Mueller et al.
9,865,471 B2 1/2018 Shimoda et al.
9,865,893 B2 1/2018 Esswein et al.
9,870,898 B2 1/2018 Urakawa et al.
9,872,373 B1 1/2018 Shimizu et al.

(56) References Cited

U.S. PATENT DOCUMENTS 9,881,820 B2 1/2018 Wong et al.
9,922,802 B2 3/2018 Hirano et al.
9,922,806 B2 3/2018 Tomura et al.
9,929,004 B2 3/2018 Ziemba et al.
9,941,097 B2 4/2018 Yamazawa et al.
9,941,098 B2 4/2018 Nagami
9,960,763 B2 5/2018 Miller et al.
9,972,503 B2 5/2018 Tomura et al.
9,997,374 B2 6/2018 Takeda et al.
10,020,800 B2 7/2018 Prager et al.
10,026,593 B2 7/2018 Alt et al.
10,027,314 B2 7/2018 Prager et al.
10,041,174 B2 8/2018 Matsumoto et al.
10,042,407 B2 8/2018 Grede et al.
10,063,062 B2 8/2018 Voronin et al.
10,074,518 B2 9/2018 Van Zyl
10,085,796 B2 10/2018 Podany
10,090,191 B2 10/2018 Tomura et al.
10,102,321 B2 10/2018 Povolny et al.
10,109,461 B2 10/2018 Yamada et al.
10,115,567 B2 10/2018 Hirano et al.
10,115,568 B2 10/2018 Kellogg et al.
10,176,970 B2 1/2019 Nitschke
10,176,971 B2 1/2019 Nagami
10,181,392 B2 1/2019 Leypold et al.
10,199,246 B2 2/2019 Koizumi et al.
10,217,618 B2 2/2019 Larson et al.
10,217,933 B2 2/2019 Nishimura et al.
10,224,822 B2 3/2019 Miller et al.
10,229,819 B2 3/2019 Hirano et al.
10,249,498 B2 4/2019 Ventzek et al.
10,268,846 B2 4/2019 Miller et al.
10,269,540 B1 * 4/2019 Carter .............. H01J 37/32183
10,276,420 B2 4/2019 Ito et al.
10,282,567 B2 5/2019 Miller et al.
10,283,321 B2 5/2019 Yang et al.
10,290,506 B2 5/2019 Ranjan et al.
10,297,431 B2 5/2019 Zelechowski et al.
10,304,661 B2 5/2019 Ziemba et al.
10,304,668 B2 5/2019 Coppa et al.
10,312,048 B2 6/2019 Dorf et al.
10,312,056 B2 6/2019 Collins et al.
10,320,373 B2 6/2019 Prager et al.
10,332,730 B2 6/2019 Christie
10,340,123 B2 7/2019 Ohtake
10,348,186 B2 7/2019 Schuler et al.
10,354,839 B2 7/2019 Alt et al.
10,373,755 B2 8/2019 Prager et al.
10,373,804 B2 8/2019 Koh et al.
10,373,811 B2 8/2019 Christie et al.
10,381,237 B2 8/2019 Takeda et al.
10,382,022 B2 8/2019 Prager et al.
10,387,166 B2 8/2019 Preston et al.
10,388,544 B2 8/2019 Ui et al.
10,389,345 B2 8/2019 Ziemba et al.
10,410,877 B2 9/2019 Takashima et al.
10,431,437 B2 10/2019 Gapi
70nski et al.
10,438,797 B2 10/2019 Cottle et al.
10,446,453 B2 10/2019 Coppa et al.
10,447,174 B1 10/2019 Porter, Jr. et al.
10,448,494 B1 10/2019 Dorf et al.
10,448,495 B1 10/2019 Dorf et al.
10,453,656 B2 10/2019 Carducci et al.
10,460,910 B2 10/2019 Ziemba et al.
10,460,911 B2 10/2019 Ziemba et al.
10,460,916 B2 10/2019 Boyd, Jr. et al.
10,483,089 B2 11/2019 Ziemba et al.
10,483,100 B2 11/2019 Ishizaka et al.
10,510,575 B2 12/2019 Kraus et al.
10,522,343 B2 12/2019 Tapily et al.
10,535,502 B2 1/2020 Carducci et al.
10,546,728 B2 1/2020 Carducci et al.
10,553,407 B2 2/2020 Nagami et al.
10,555,412 B2 2/2020 Dorf et al.
10,580,620 B2 3/2020 Carducci et al.
10,593,519 B2 3/2020 Yamada et al.
10,607,813 B2 3/2020 Fairbairn et al.
10,607,814 B2 3/2020 Ziemba et al.
10,658,189 B2 5/2020 Hatazaki et al.
10,659,019 B2 5/2020 Slobodov et al.
10,665,434 B2 5/2020 Matsumoto et al.
10,666,198 B2 5/2020 Prager et al.
10,672,589 B2 6/2020 Koshimizu et al.
10,672,596 B2 6/2020 Brcka
10,672,616 B2 6/2020 Kubota
10,685,807 B2 6/2020 Dorf et al.
10,707,053 B2 7/2020 Urakawa et al.
10,707,054 B1 7/2020 Kubota
10,707,055 B2 7/2020 Shaw et al.
10,707,086 B2 7/2020 Yang et al.
10,707,090 B2 7/2020 Takayama et al.
10,707,864 B2 7/2020 Miller et al.
10,714,372 B2 7/2020 Chua et al.
10,720,305 B2 7/2020 Van Zyl
10,734,906 B2 8/2020 Miller et al.
10,748,746 B2 8/2020 Kaneko et al.
10,755,894 B2 8/2020 Hirano et al.
10,763,150 B2 9/2020 Lindley et al.
10,773,282 B2 9/2020 Coppa et al.
10,774,423 B2 9/2020 Janakiraman et al.
10,777,388 B2 9/2020 Ziemba et al.
10,790,816 B2 9/2020 Ziemba et al.
10,791,617 B2 9/2020 Dorf et al.
10,796,887 B2 10/2020 Prager et al.
10,804,886 B2 10/2020 Miller et al.
10,811,227 B2 10/2020 Van Zyl et al.
10,811,228 B2 10/2020 Van Zyl et al.
10,811,229 B2 10/2020 Van Zyl et al.
10,811,230 B2 10/2020 Ziemba et al.
10,811,296 B2 10/2020 Cho et al.
10,847,346 B2 11/2020 Ziemba et al.
10,892,140 B2 1/2021 Ziemba et al.
10,892,141 B2 1/2021 Ziemba et al.
10,896,807 B2 1/2021 Fairbairn et al.
10,896,809 B2 1/2021 Ziemba et al.
10,903,047 B2 1/2021 Ziemba et al.
10,904,996 B2 1/2021 Koh et al.
10,916,408 B2 2/2021 Dorf et al.
10,923,320 B2 2/2021 Koh et al.
10,923,321 B2 2/2021 Dorf et al.
10,923,367 B2 2/2021 Lubomirsky et al.
10,923,379 B2 2/2021 Liu et al.
10,971,342 B2 4/2021 Engelstaedter et al.
10,978,274 B2 4/2021 Kubota
10,978,955 B2 4/2021 Ziemba et al.
10,985,740 B2 4/2021 Prager et al.
10,991,553 B2 4/2021 Ziemba et al.
10,991,554 B2 4/2021 Zhao et al.
10,998,169 B2 5/2021 Ventzek et al.
11,004,660 B2 5/2021 Prager et al.
11,011,349 B2 5/2021 Brouk et al.
11,075,058 B2 7/2021 Ziemba et al.
11,095,280 B2 8/2021 Ziemba et al.
11,101,108 B2 8/2021 Slobodov et al.
11,108,384 B2 8/2021 Prager et al.
11,365,479 B2 * 6/2022 Shanbhag ............. C23C 16/401
2001/0009139 A1 7/2001 Shan et al.
2001/0033755 A1 10/2001 Ino et al.
2002/0069971 A1 6/2002 Kaji et al.
2002/0078891 A1 6/2002 Chu et al.
2003/0026060 A1 2/2003 Hiramatsu et al.
2003/0029859 A1 2/2003 Knoot et al.
2003/0049558 A1 3/2003 Aoki et al.
2003/0052085 A1 3/2003 Parsons
2003/0079983 A1 5/2003 Long et al.
2003/0091355 A1 5/2003 Jeschonek et al.
2003/0137791 A1 7/2003 Arnet et al.
2003/0151372 A1 8/2003 Tsuchiya et al.
2003/0165044 A1 9/2003 Yamamoto
2003/0201069 A1 10/2003 Johnson
2004/0040665 A1 3/2004 Mizuno et al.
2004/0040931 A1 3/2004 Koshiishi et al.
2004/0066601 A1 4/2004 Larsen

(56) References Cited

U.S. PATENT DOCUMENTS

2004/0112536 A1 6/2004 Quon
2004/0223284 A1 11/2004 Iwami et al.
2005/0022933 A1 2/2005 Howard
2005/0024809 A1 2/2005 Kuchimachi
2005/0039852 A1 2/2005 Roche et al.
2005/0092596 A1 5/2005 Kouznetsov
2005/0098118 A1 5/2005 Amann et al.
2005/0151544 A1 7/2005 Mahoney et al.
2005/0152159 A1 7/2005 Isurin et al.
2005/0286916 A1 12/2005 Nakazato et al.
2006/0075969 A1 4/2006 Fischer
2006/0130767 A1 6/2006 Herchen
2006/0139843 A1 6/2006 Kim
2006/0158823 A1 7/2006 Mizuno et al.
2006/0171848 A1 8/2006 Roche et al.
2006/0219178 A1 10/2006 Asakura
2006/0278521 A1 12/2006 Stowell
2007/0113787 A1 5/2007 Higashiura et al.
2007/0114981 A1 5/2007 Vasquez et al.
2007/0196977 A1 8/2007 Wang et al.
2007/0284344 A1 12/2007 Todorov et al.
2007/0285869 A1 12/2007 Howald
2007/0297118 A1 12/2007 Fujii
2008/0012548 A1 1/2008 Gerhardt et al.
2008/0037196 A1 2/2008 Yonekura et al.
2008/0048498 A1 2/2008 Wiedemuth et al.
2008/0106842 A1 5/2008 Ito et al.
2008/0135401 A1 6/2008 Kadlec et al.
2008/0160212 A1 7/2008 Koo et al.
2008/0185537 A1 8/2008 Walther et al.
2008/0210545 A1 9/2008 Kouznetsov
2008/0236493 A1 10/2008 Sakao
2008/0252225 A1 10/2008 Kurachi et al.
2008/0272706 A1 11/2008 Kwon et al.
2008/0289576 A1 11/2008 Lee et al.
2009/0016549 A1 1/2009 French et al.
2009/0059462 A1 3/2009 Mizuno et al.
2009/0078678 A1 3/2009 Kojima et al.
2009/0133839 A1 5/2009 Yamazawa et al.
2009/0236214 A1 9/2009 Janakiraman et al.
2009/0295295 A1 12/2009 Shannon et al.
2010/0018648 A1 1/2010 Collins et al.
2010/0025230 A1 2/2010 Ehiasarian et al.
2010/0029038 A1 2/2010 Murakawa
2010/0072172 A1 3/2010 Ui et al.
2010/0101935 A1 4/2010 Chistyakov et al.
2010/0118464 A1 5/2010 Matsuyama
2010/0154994 A1 6/2010 Fischer et al.
2010/0193491 A1 8/2010 Cho et al.
2010/0271744 A1 10/2010 Ni et al.
2010/0276273 A1 11/2010 Heckman et al.
2010/0321047 A1 12/2010 Zollner et al.
2010/0326957 A1 12/2010 Maeda et al.
2011/0096461 A1 4/2011 Yoshikawa et al.
2011/0100807 A1 5/2011 Matsubara et al.
2011/0143537 A1 6/2011 Lee et al.
2011/0157760 A1 6/2011 Willwerth et al.
2011/0177669 A1 7/2011 Lee et al.
2011/0177694 A1 7/2011 Chen et al.
2011/0259851 A1 10/2011 Brouk et al.
2011/0281438 A1 11/2011 Lee et al.
2011/0298376 A1 12/2011 Kanegae et al.
2012/0000421 A1 1/2012 Miller et al.
2012/0052599 A1 3/2012 Brouk et al.
2012/0081350 A1 4/2012 Sano et al.
2012/0088371 A1 4/2012 Ranjan et al.
2012/0171390 A1 7/2012 Nauman et al.
2012/0319584 A1 12/2012 Brouk et al.
2013/0059448 A1 3/2013 Marakhtanov et al.
2013/0087447 A1 4/2013 Bodke et al.
2013/0175575 A1 7/2013 Ziemba et al.
2013/0213935 A1 8/2013 Liao et al.
2013/0214828 A1 8/2013 Valcore, Jr. et al.
2013/0340938 A1 12/2013 Tappan et al.
2013/0344702 A1 12/2013 Nishizuka
2014/0057447 A1 2/2014 Yang et al.
2014/0061156 A1 3/2014 Brouk et al.
2014/0062495 A1 3/2014 Carter et al.
2014/0077611 A1 3/2014 Young et al.
2014/0109886 A1 4/2014 Singleton et al.
2014/0117861 A1 5/2014 Finley et al.
2014/0125315 A1 5/2014 Kirchmeier et al.
2014/0154819 A1 6/2014 Gaff et al.
2014/0177123 A1 6/2014 Thach et al.
2014/0231389 A1* 8/2014 Nagami ............ H01J 37/32706
156/345.28
2014/0238844 A1 8/2014 Chistyakov
2014/0262755 A1 9/2014 Deshmukh et al.
2014/0263182 A1 9/2014 Chen et al.
2014/0273487 A1 9/2014 Deshmukh et al.
2014/0305905 A1 10/2014 Yamada et al.
2014/0356984 A1 12/2014 Ventzek et al.
2014/0361690 A1 12/2014 Yamada et al.
2014/0367044 A1* 12/2014 Sato .................. H01J 37/32183
156/345.28
2015/0002018 A1 1/2015 Lill et al.
2015/0043123 A1 2/2015 Cox
2015/0076112 A1 3/2015 Sriraman et al.
2015/0084509 A1 3/2015 Yuzurihara et al.
2015/0111394 A1 4/2015 Hsu et al.
2015/0116889 A1 4/2015 Yamasaki et al.
2015/0130354 A1 5/2015 Leray et al.
2015/0130525 A1 5/2015 Miller et al.
2015/0161073 A1* 6/2015 Beeson ................... G06F 3/067
710/110
2015/0170952 A1 6/2015 Subramani et al.
2015/0181683 A1 6/2015 Singh et al.
2015/0221484 A1* 8/2015 Iliopoulos ............. C23C 16/505
118/697
2015/0235809 A1 8/2015 Ito et al.
2015/0256086 A1 9/2015 Miller et al.
2015/0303914 A1 10/2015 Ziemba et al.
2015/0315698 A1 11/2015 Chistyakov
2015/0318846 A1 11/2015 Prager et al.
2015/0325413 A1 11/2015 Kim et al.
2015/0366004 A1 12/2015 Nangoy et al.
2016/0004475 A1 1/2016 Beniyama et al.
2016/0020072 A1 1/2016 Brouk et al.
2016/0027678 A1 1/2016 Parkhe et al.
2016/0056017 A1 2/2016 Kim et al.
2016/0064189 A1 3/2016 Tandou et al.
2016/0196958 A1 7/2016 Leray et al.
2016/0241234 A1 8/2016 Mavretic
2016/0252892 A1* 9/2016 Valcore, Jr. .......... G05B 19/052
700/3
2016/0284514 A1 9/2016 Hirano et al.
2016/0314946 A1 10/2016 Pelleymounter
2016/0322242 A1 11/2016 Nguyen et al.
2016/0327029 A1 11/2016 Ziemba et al.
2016/0351375 A1 12/2016 Valcore, Jr. et al.
2016/0358755 A1 12/2016 Long et al.
2017/0011887 A1 1/2017 Deshmukh et al.
2017/0018411 A1 1/2017 Sriraman et al.
2017/0022604 A1 1/2017 Christie et al.
2017/0029937 A1 2/2017 Chistyakov et al.
2017/0069462 A1 3/2017 Kanarik et al.
2017/0076962 A1 3/2017 Engelhardt
2017/0084432 A1* 3/2017 Valcore, Jr. ....... H01J 37/32146
2017/0098527 A1 4/2017 Kawasaki et al.
2017/0098549 A1 4/2017 Agarwal
2017/0110335 A1 4/2017 Yang et al.
2017/0110358 A1 4/2017 Sadjadi et al.
2017/0113355 A1 4/2017 Genetti et al.
2017/0115657 A1 4/2017 Trussell et al.
2017/0117172 A1 4/2017 Genetti et al.
2017/0154726 A1 6/2017 Prager et al.
2017/0162417 A1 6/2017 Ye et al.
2017/0163254 A1 6/2017 Ziemba et al.
2017/0169996 A1 6/2017 Ul et al.
2017/0170449 A1 6/2017 Alexander et al.
2017/0178917 A1 6/2017 Kamp et al.
2017/0221682 A1 8/2017 Nishimura et al.
2017/0236688 A1 8/2017 Caron et al.
2017/0236741 A1 8/2017 Angelov et al.

(56) References Cited

U.S. PATENT DOCUMENTS

2017/0236743 A1 8/2017 Severson et al.
2017/0243731 A1 8/2017 Ziemba et al.
2017/0250056 A1 8/2017 Boswell et al.
2017/0263478 A1 9/2017 McCHESNEY et al.
2017/0278665 A1 9/2017 Carter et al.
2017/0287791 A1 10/2017 Coppa et al.
2017/0311431 A1 10/2017 Park
2017/0316935 A1 11/2017 Tan et al.
2017/0330734 A1 11/2017 Lee et al.
2017/0330786 A1 11/2017 Genetti et al.
2017/0334074 A1 11/2017 Genetti et al.
2017/0358431 A1 12/2017 Dorf et al.
2017/0366173 A1 12/2017 Miller et al.
2017/0372912 A1 12/2017 Long et al.
2018/0019100 A1 1/2018 Brouk et al.
2018/0076032 A1 3/2018 Wang et al.
2018/0077788 A1 3/2018 Van Zyl
2018/0102769 A1 4/2018 Prager et al.
2018/0139834 A1 5/2018 Nagashima et al.
2018/0163302 A1 6/2018 Kapoor et al.
2018/0166249 A1 6/2018 Dorf et al.
2018/0189524 A1 7/2018 Miller et al.
2018/0190501 A1 7/2018 Ueda
2018/0204708 A1 7/2018 Tan et al.
2018/0205369 A1 7/2018 Prager et al.
2018/0218905 A1 8/2018 Park et al.
2018/0226225 A1 8/2018 Koh et al.
2018/0226896 A1 8/2018 Miller et al.
2018/0253570 A1 9/2018 Miller et al.
2018/0286636 A1 10/2018 Ziemba et al.
2018/0294566 A1 10/2018 Wang et al.
2018/0309423 A1 10/2018 Okunishi et al.
2018/0331655 A1 11/2018 Prager et al.
2018/0350649 A1 12/2018 Gomm
2018/0366305 A1 12/2018 Nagami et al.
2018/0374672 A1 12/2018 Hayashi et al.
2019/0027344 A1 1/2019 Okunishi et al.
2019/0080884 A1 3/2019 Ziemba et al.
2019/0090338 A1 3/2019 Koh et al.
2019/0096633 A1 3/2019 Pankratz et al.
2019/0103293 A1* 4/2019 Kim .................. H01L 21/67069
2019/0157041 A1 5/2019 Zyl et al.
2019/0157042 A1 5/2019 Van Zyl et al.
2019/0157044 A1 5/2019 Ziemba et al.
2019/0172685 A1 6/2019 Van Zyl et al.
2019/0172688 A1 6/2019 Ueda
2019/0180982 A1 6/2019 Brouk et al.
2019/0198333 A1 6/2019 Tokashiki
2019/0259562 A1 8/2019 Dorf et al.
2019/0267218 A1 8/2019 Wang et al.
2019/0277804 A1 9/2019 Prager et al.
2019/0295769 A1 9/2019 Prager et al.
2019/0295819 A1 9/2019 Okunishi et al.
2019/0318918 A1 10/2019 Saitoh et al.
2019/0333741 A1 10/2019 Nagami et al.
2019/0341232 A1 11/2019 Thokachichu et al.
2019/0348258 A1 11/2019 Koh et al.
2019/0348263 A1 11/2019 Okunishi
2019/0363388 A1 11/2019 Esswein et al.
2019/0385822 A1 12/2019 Marakhtanov et al.
2019/0393791 A1 12/2019 Ziemba et al.
2020/0016109 A1 1/2020 Feng et al.
2020/0020510 A1 1/2020 Shoeb et al.
2020/0024330 A1 1/2020 Chan-Hui et al.
2020/0035457 A1 1/2020 Ziemba et al.
2020/0035458 A1 1/2020 Ziemba et al.
2020/0035459 A1 1/2020 Ziemba et al.
2020/0036367 A1 1/2020 Slobodov et al.
2020/0037468 A1 1/2020 Ziemba et al.
2020/0051785 A1 2/2020 Miller et al.
2020/0051786 A1 2/2020 Ziemba et al.
2020/0058475 A1 2/2020 Engelstaedter et al.
2020/0066497 A1 2/2020 Engelstaedter et al.
2020/0066498 A1 2/2020 Engelstaedter et al.
2020/0075293 A1 3/2020 Ventzek et al.
2020/0090905 A1 3/2020 Brouk et al.
2020/0106137 A1 4/2020 Murphy et al.
2020/0126760 A1 4/2020 Ziemba et al.
2020/0126762 A1 4/2020 Yang et al.
2020/0126837 A1 4/2020 Kuno et al.
2020/0144030 A1 5/2020 Prager et al.
2020/0161091 A1 5/2020 Ziemba et al.
2020/0161098 A1 5/2020 Cui et al.
2020/0161155 A1 5/2020 Rogers et al.
2020/0162061 A1 5/2020 Prager et al.
2020/0168436 A1 5/2020 Ziemba et al.
2020/0168437 A1 5/2020 Ziemba et al.
2020/0176221 A1 6/2020 Prager et al.
2020/0219706 A1 7/2020 Koshimizu
2020/0227230 A1 7/2020 Ziemba et al.
2020/0227289 A1 7/2020 Song et al.
2020/0234922 A1 7/2020 Dorf et al.
2020/0234923 A1 7/2020 Dorf et al.
2020/0243303 A1 7/2020 Mishra et al.
2020/0251371 A1 8/2020 Kuno et al.
2020/0266022 A1 8/2020 Dorf et al.
2020/0266035 A1 8/2020 Nagaiwa
2020/0286720 A1 9/2020 van Greunen et al.
2020/0294770 A1 9/2020 Kubota
2020/0328739 A1 10/2020 Miller et al.
2020/0352017 A1 11/2020 Dorf et al.
2020/0357607 A1 11/2020 Ziemba et al.
2020/0373114 A1 11/2020 Prager et al.
2020/0373126 A1 11/2020 Na et al.
2020/0381214 A1* 12/2020 Leray .................. H01L 21/3065
2020/0389126 A1 12/2020 Prager et al.
2020/0407840 A1 12/2020 Hayashi et al.
2020/0411286 A1 12/2020 Koshimizu et al.
2020/0411288 A1 12/2020 Wang et al.
2021/0005428 A1 1/2021 Shaw et al.
2021/0013006 A1 1/2021 Nguyen et al.
2021/0013011 A1 1/2021 Prager et al.
2021/0013874 A1 1/2021 Miller et al.
2021/0027990 A1 1/2021 Ziemba et al.
2021/0029815 A1 1/2021 Bowman et al.
2021/0043472 A1 2/2021 Koshimizu et al.
2021/0051792 A1 2/2021 Dokan et al.
2021/0066042 A1 3/2021 Ziemba et al.
2021/0082669 A1 3/2021 Koshiishi et al.
2021/0091759 A1 3/2021 Prager et al.
2021/0125812 A1 4/2021 Ziemba et al.
2021/0130955 A1 5/2021 Nagaike et al.
2021/0134562 A1 5/2021 Fairbairn et al.
2021/0140044 A1 5/2021 Nagaike et al.
2021/0151295 A1 5/2021 Ziemba et al.
2021/0152163 A1 5/2021 Miller et al.
2021/0210313 A1 7/2021 Ziemba et al.
2021/0210315 A1 7/2021 Ziemba et al.
2021/0249227 A1 8/2021 Bowman et al.
2021/0272775 A1 9/2021 Koshimizu
2021/0288582 A1 9/2021 Ziemba et al.
2021/0313948 A1 10/2021 Leeser et al.
2021/0327684 A1* 10/2021 Bhutta ................ H01J 37/3299
2021/0358785 A1* 11/2021 Merton ............. H01J 37/32935
2022/0037121 A1 2/2022 Dorf et al.
2022/0037129 A1 2/2022 Koshimizu
2022/0115209 A1 4/2022 Kim et al.
2022/0404785 A1* 12/2022 Gahan ............... H01J 37/32183
2025/0015819 A1* 1/2025 Juco .................. H01J 37/32935

FOREIGN PATENT DOCUMENTS

CN 101707186 B 2/2012
CN 105408993 A 3/2016
CN 106206234 A 12/2016
CN 104752134 B 2/2017
EP 665306 A1 8/1995
EP 983394 A1 3/2000
EP 1119033 A1 7/2001
EP 1203441 A1 5/2002
EP 1214459 A1 6/2002
EP 1418670 A1 5/2004
EP 1691481 A1 8/2006
EP 1701376 A1 9/2006

(56) References Cited

FOREIGN PATENT DOCUMENTS

EP 1708239 A1 10/2006
EP 1780777 A1 5/2007
EP 1852959 A1 11/2007
EP 2016610 A1 1/2009
EP 2096679 A1 9/2009
EP 2221614 A1 8/2010
EP 2541584 A1 1/2013
EP 2580368 A1 4/2013
EP 2612544 A1 7/2013
EP 2838112 A1 2/2015
EP 2991103 A1 3/2016
EP 3086359 A1 10/2016
EP 3396700 A1 10/2018
EP 3616234 A1 3/2020
JP H08236602 A 9/1996
JP 2748213 B2 5/1998
JP H11025894 A 1/1999
JP 2002299322 A 10/2002
JP 2002313899 A 10/2002
JP 2002540582 A 11/2002
JP 2004096019 A * 3/2004 ......... H01L 21/3065
JP 4418424 B2 2/2010
JP 2011-35266 A 2/2011
JP 2011182046 A 9/2011
JP 5018244 B2 9/2012
JP 2014112644 A 6/2014
JP 2016181343 A 10/2016
JP 2016225439 A 12/2016
JP 6741461 B2 8/2020
JP 2021503700 A 2/2021
JP 2021131973 A 9/2021
KR 100757347 B1 9/2007
KR 10-2007-0098556 A 10/2007
KR 20160042429 A 4/2016
KR 10-1950440 B1 * 2/2019 ........... H01L 21/205
KR 20200036947 A 4/2020
TW 498706 B 8/2002
TW 201717247 A 5/2017
TW 201924493 A 6/2019
WO 1998053116 A1 11/1998
WO 2000017920 A1 3/2000
WO 2000030147 A1 5/2000
WO 2000063459 A1 10/2000
WO 2001005020 A1 1/2001
WO 2001012873 A1 2/2001
WO 2001013402 A1 2/2001
WO 2002052628 A1 7/2002
WO 2002054835 A2 7/2002
WO 2002059954 A1 8/2002
WO 2003037497 A2 5/2003
WO 2003052882 A2 6/2003
WO 2003054911 A2 7/2003
WO 2003077414 A2 9/2003
WO 2004084394 A1 9/2004
WO 2005124844 A1 12/2005
WO 2007118042 A2 10/2007
WO 2008016747 A2 2/2008
WO 2008050619 A1 5/2008
WO 2008061775 A1 5/2008
WO 2008061784 A1 5/2008
WO 2008062663 A1 5/2008
WO 2009012804 A1 1/2009
WO 2009069670 A1 6/2009
WO 2009111473 A2 9/2009
WO 2011073093 A1 6/2011
WO 2011087984 A2 7/2011
WO 2011156055 A1 12/2011
WO 2012030500 A1 3/2012
WO 2012109159 A1 8/2012
WO 2012122064 A1 9/2012
WO 2013000918 A1 1/2013
WO 2013016619 A1 1/2013
WO 2013084459 A1 6/2013
WO 2013088677 A1 6/2013
WO 2013099133 A1 7/2013
WO 2013114882 A1 8/2013
WO 2013118660 A1 8/2013
WO 2013125523 A1 8/2013
WO 2013187218 A1 12/2013
WO 2014035889 A1 3/2014
WO 2014035894 A1 3/2014
WO 2014035897 A1 3/2014
WO 2014036000 A1 3/2014
WO 2014124857 A2 8/2014
WO 2014197145 A1 12/2014
WO 2017208807 A1 12/2014
WO 2015060185 A1 4/2015
WO 2014124857 A3 5/2015
WO 2015134398 A1 9/2015
WO 2015198854 A1 12/2015
WO 2016002547 A1 1/2016
WO 2016060058 A1 4/2016
WO 2016060063 A1 4/2016
WO 2015073921 A8 5/2016
WO 2016104098 A1 6/2016
WO 2016128384 A1 8/2016
WO 2016131061 A1 8/2016
WO 2016170989 A1 10/2016
WO 2017172536 A1 10/2017
WO 2018048925 A1 3/2018
WO 2018111751 A1 6/2018
WO 2018170010 A1 9/2018
WO 2018197702 A1 11/2018
WO 2018217349 A1 11/2018
WO 2019036587 A1 2/2019
WO 2019040949 A1 2/2019
WO 2019099870 A1 5/2019
WO 2019185423 A1 10/2019
WO 2019225184 A1 11/2019
WO 2019239872 A1 12/2019
WO 2019244697 A1 12/2019
WO 2019244698 A1 12/2019
WO 2019244734 A1 12/2019
WO 2019245729 A1 12/2019
WO 2020004048 A1 1/2020
WO 2020017328 A1 1/2020
WO 2020022318 A1 1/2020
WO 2020022319 A1 1/2020
WO 2020026802 A1 2/2020
WO 2020033931 A1 2/2020
WO 2020036806 A1 2/2020
WO 2020037331 A1 2/2020
WO 2020046561 A1 3/2020
WO 2020051064 A1 3/2020
WO 2020081827 A1 4/2020
WO 2020112921 A1 6/2020
WO 2020121819 A1 6/2020
WO 2020145051 A1 7/2020
WO 2021003319 A1 1/2021
WO 2016059207 A1 4/2021
WO 2021062223 A1 4/2021
WO 2021097459 A1 5/2021
WO 2021134000 A1 7/2021
WO 2019099102 A1 5/2024

OTHER PUBLICATIONS

International Search Report/ Written Opinion issued to PCT/US2022/054062 on Jul. 31, 2023.

Taiwanese Office Action for Application No. 112101165 dated Nov. 18, 2025.

Wang, S.B., et al.—"Control of ion energy distribution at substrates during plasma processing," Journal of Applied Physics, vol. 88, No. 2, Jul. 15, 2000, pp. 643-646.

Eagle Harbor Technologies presentation by Dr. Kenneth E. Miller—"The EHT Integrated Power Module (IPM): An IGBT-Based, High Current, Ultra-Fast, Modular, Programmable Power Supply Unit," Jun. 2013, 21 pages.

Eagle Harbor Technologies webpage—"In Situ Testing of EHT Integrators on a Tokamak," 2015, 1 page.

Eagle Harbor Technologies webpage—High Gain and Frequency Ultra-Stable Integrators for Long Pulse and/or High Current Applications, 2018, 1 page.

(56) References Cited

OTHER PUBLICATIONS

Eagle Harbor Technologies webpage—"EHT Integrator Demonstration at DIII-D," 2015, 1 page.
Eagle Harbor Technologies webpage—"High Gain and Frequency Ultra-Stable Integrators for ICC and Long Pulse ITER Applications," 2012, 1 page.
Eagle Harbor Technologies webpage—"Long-Pulse Integrator Testing with DIII-D Magnetic Diagnostics," 2016, 1 page.
Sunstone Circuits—"Eagle Harbor Tech Case Study," date unknown, 4 pages.
Prager, J.R., et al.—"A High Voltage Nanosecond Pulser with Variable Pulse Width and Pulse Repetition Frequency Control for Nonequilibrium Plasma Applications," IEEE 41st International Conference on Plasma Sciences {ICOPS) held with 2014 IEEE International Conference on High-Power Particle Beams (BEAMS), pp. 1-6, 2014.
Kamada, Keiichi, et al., Editors—"New Developments of Plasma Science with Pulsed Power Technology," Research Report, NIFS-PROC-82, presented at National Institute for Fusion Science, Toki, Gifu, Japan, Mar. 5-6, 2009, 109 pages.
Semiconductor Components Industries, LLC (SCILLC)—"Switch-Mode Power Supply" Reference Manual, SMPSRM/D, Rev. 4, Apr. 2014, ON Semiconductor, 73 pages.
PCT International Search Report and Written Opinion dated Nov. 9, 2018, for International Application No. PCT/ US2018/043032, pp. 10.
Taiwan Office Action for Application No. 107125613 dated Dec. 24, 2020, 16 pages.
PCT International Search Report and Written Opinion dated Nov. 7, 2018, for International Application No. PCT/US2018/042965, pp. 10.
International Search Report and Written Opinion for PCT/US2019/052067 dated Jan. 21, 2020, pp. 10.
ELECTRICAL 4 U webpage—"Clamping Circuit," Aug. 29, 2018, 9 pages.
Kyung Chae Yang et al., A study on the etching characteristics of magnetic tunneling junction materials using DC pulse-biased inductively coupled plasmas, Japanese Journal of Applied Physics, vol. 54, 01AE01, Oct. 29, 2014, 6 pages.
PCT Notification of Transmittal of the International Search Report and the Written Opinion of the International Searching Authority for International Application No. PCT/US2019/048392; dated Dec. 16, 2019; 13 pages.
PCT International Search Report and Written Opinion dated Nov. 7, 2018, for International Application No. PCT/US2018/042961, pp. 12.
PCT International Search Report and Written Opinion dated Nov. 7, 2018, for International Application No. PCT/US2018/042956, pp. 9.
U.S. Appl. No. 62/433,204; entitled Creating Arbitrarily-Shaped Ion Energy Distribution Function {IEDF) Using Shaped-Pulse (EV) Bias; by Leonid Dorf, et al.; filed Dec. 16, 2016; 22 total pages.
U.S. Appl. No. 15/424,405; entitled System for Tunable Workpiece Biasing in a Plasma Reactor; by Travis Koh, et al.; filed Feb. 3, 2017; 29 total pages.
U.S. Appl. No. 15/618,082; entitled Systems and Methods for Controlling a Voltage Waveform at a Substrate During Plasma Processing; by Leonid Dorf, et al.; filed Jun. 8, 2017; 35 total pages.
PCT Notification of Transmittal of the International Search Report and the Written Opinion of the International Searching Authority for International Application No. PCT/US2018/046171; dated Nov. 28, 2018; 10 total pages.
PCT Notification of Transmittal of the International Search Report and the Written Opinion of the International Searching Authority for International Application No. PCT/US2018/046182; dated Nov. 30, 2018; 10 total pages.
Eagle Harbor Technologies presentation by Dr. Kenneth E. Miller—"The EHT Long Pulse Integrator Program," ITPA Diagnostic Meeting, General Atomics, Jun. 4-7, 2013, 18 pages.
Lin, Jianliang, et al., -- "Diamond like carbon films deposited by HiPIMS using oscillatory voltage pulses," Surface & Coatings Technology 258, 2014, published by Elsevier B.V., pp. 1212-1222.
PCT/US2020/014453 Interanational Search Report and Written Opinion dated May 14, 2020 consists of 8 pages.
S.B. Wang et al. "lon Bombardment Energy and SiO 2/Si Fluorocarbon Plasma Etch Selectivity", Journal of Vacuum Science & Technology A 19, 2425 (2001). pages 9.
Korean Office Action for 10-2020-7007495 dated Jun. 14, 2021 (Docket No. 025517KR01).
Zhen-hua Bi et al., A brief review of dual-frequency capacitively coupled discharges, Current Applied Physics, vol. 11, Issue 5, Supplement, 2011, Pages S2-S8.
Chang, Bingdong, " Oblique angled plasma etching for 3D silicon structures with wiggling geometries" 31(8), [085301]. https://doi.org/10.1088/1361-6528/ab53fb. DTU Library. 2019 p. 10.
Michael A. Lieberman, "A short course of the principles of plasma discharges and materials processing", Department of Electrical Engineering and Computer Sciences University of California, Berkeley, CA 94720 p. 122.
Dr. Steve Sirard, "Introduction to Plasma Etching", Lam Research Corporation. 64 pages. Apr. 2022, available via wayback machine.
Zhuoxing Luo, B_S_, M.S, "Rf Plasma Etching With A Dc Bias" A Dissertation in Physics_ Dec. 1994. pages 135.
Michael A. Lieberman, "Principles of Plasma Discharges and Material Processing", A Wiley Interscience Publication. 1994. pages 299.
Yiting Zhang et al. "Investigation of feature orientation and consequences of ion tilting during plasma etching with a three-dimensional feature profile simulator", Nov. 22, 2016. pages 16.
Richard Barnett et al. A New Plasma Source for Next Generation MEMS Deep Si Etching: Minimal Tilt, Improved Profile Uniformity and Higher Etch Rates, SPP Process Technology Systems. 2010, pp. 4.
The International Search Report and the Written Opinion for International Application No. PCT/US2021/040380; dated Oct. 27, 2021; 10 pages.
International Search Report and Written Opinion dated Feb. 4, 2022 for Application No. PCT/US2021/054806, pp. 10.
International Search Report and Written Opinion dated Feb. 4, 2022 for Application No. PCT/US2021/054814, pp. 10.
U.S. Appl. No. 17/346,103, filed Jun. 11, 2021.
U.S. Appl. No. 17/349,763, filed Jun. 16, 2021.
U.S. Appl. No. 63/242,410, filed Sep. 9, 2021.
U.S. Appl. No. 17/410,803, filed Aug. 24, 2021.
U.S. Appl. No. 17/537,107, filed Nov. 29, 2021.
U.S. Appl. No. 17/352,165, filed Jun. 18, 2021.
U.S. Appl. No. 17/352,176, filed Jun. 18, 2021.
U.S. Appl. No. 17/337,146, filed Jun. 2, 2021.
U.S. Appl. No. 17/361,178, filed Jun. 28, 2021.
U.S. Appl. No. 63/210,956, filed Jun. 15, 2021.
U.S. Appl. No. 17/475,223, filed Sep. 14, 2021.
U.S. Appl. No. 17/537,314, filed Nov. 29, 2021.
Chinese Office Action for 201880053380.1 dated Dec. 2, 2021. pages 11.
Taiwan Office Action for 108132682 dated Mar. 24, 2022, pp. 10.
International Search Report/Written Opinion issued to PCT/US2022/053455 on May 9, 2023, pp. 13.
PCT/US2022/054317, International Search Report and Written Opinion dated Jul. 4, 2023, 10 pages.
PCT/US2023/010922, International Search Report and Written Opinion dated Sep. 1, 2023, 10 pages.
Korean Office Action dated Nov. 19, 2025 for Application No. 10-2025-7017815, 8 pages.
Korean Office Action for Application No. 10-2025-7020096 dated Dec. 29, 2025, pp. 12.
Notice of Reasons for Rejection from JP Application No. 2025-525269 dated May 26, 2026.

* cited by examiner

1000

1002

THE RF MATCH HAS AN ALGORITHM 1 WHEN USED ON CHAMBER 1

1004

THE RF MATCH HAS AN ALGORITHM 2 WHEN USED ON CHAMBER 2

RADIO FREQUENCY IMPEDANCE MATCHING NETWORK WITH FLEXIBLE TUNING ALGORITHMS

BACKGROUND

Field

Embodiments of the present disclosure generally relate to a system that includes radio frequency (RF) power sources and impedance matching networks adapted for generating a plasma in a substrate processing chamber.

Description of the Related Art

In a plasma processing chamber an RF power source provides RF power to an electrode in the plasma processing chamber for generating plasma therein, via an impedance matching network coupled between the RF power source and the electrode. The RF impedance of a plasma is a complex and highly variable function of many process parameters and conditions. The impedance matching network maximizes power transfer from the RF power source to the plasma in the reactor chamber. This is accomplished when the output impedance of the impedance matching network is equal to the complex conjugate of the input impedance of the plasma in the reactor chamber. The impedance matching network transforms the impedance of the plasma in the reactor chamber to the characteristic operating output impedance of the RF power source, e.g., 50 ohms, for optimal RF power transfer therefrom.

The RF impedance matching network is an electrical module disposed between the RF power source and the plasma reactor to optimize RF power transfer efficiency. To optimize RF power transfer, it is important for the RF impedance matching network to tune at a desired frequency to a desired complex impedance accurately. This is important for providing reliable, efficient and predictable plasma processing results on a semiconductor substrate. In order to ensure operational efficiency and accuracy, the RF impedance matching network depends on the accuracy of associated RF sensors, e.g., RF voltage, RF current and RF power sensors which are used for providing real-time plasma processing conditions, e.g., plasma chamber impedances and RF power being delivered to the plasma chamber during semiconductor manufacturing process operation. However, during the performance of a semiconductor manufacturing process on a substrate the load impedance will change as one or more process variables change during different phases of a plasma processing recipe. Typically, most conventional impedance matching networks utilize a single tuning algorithm that is used to adjust the variable matching components within the matching network to match the load impedance. However, it has been found that most tuning algorithms are not able to appropriately respond to all of the phases of a plasma processing recipe performed on a substrate, which leads to undesirable and inconsistent plasma processing results on the substrate.

Hence, there is a need for a system that solve the problems described above.

SUMMARY

Embodiments of the disclosure include a system for controlling plasma generation in a plasma processing chamber. The system includes an impedance matching network having a first node adapted for coupling to a radio frequency (RF) power generator, a second node adapted for coupling to an electrode within the plasma processing chamber, and adjustable tuning elements for transforming at least one of a plurality of impedances at the second node to an output impedance of the RF power generator at the first node. The system further includes a tool controller that is in communication with the match controller, and includes instructions that are stored in memory, which when executed by a processor of the tool controller cause a sequence of process recipe steps to be performed in the plasma processing chamber, wherein the sequence of process recipe steps include a first process recipe step, which when executed by the processor, causes at least one process variable to be adjusted to a first setting, and causes a first tuning algorithm of the plurality of tuning algorithms to be executed by the match controller, wherein the execution of the first tuning algorithm causes the at least one of the adjustable tuning elements to be set to a first impedance setting. The sequence of process recipe steps further includes a second process recipe step, which when executed by the processor, causes the at least one process variable to be adjusted to a second setting, and causes a second tuning algorithm of the plurality of tuning algorithms to be executed by the match controller, wherein the execution of the second tuning algorithm causes the at least one of the adjustable tuning elements to be set to a second impedance setting. The selection of the second tuning algorithm is based on a determination that the at least one process variable is adjusted from the first setting to the second setting.

Embodiments of the disclosure include a method for processing a substrate in a plasma processing chamber, by implementing a first process recipe step of a plasma processing recipe, that includes executing, by use of a match controller, a first tuning algorithm, that adjusts at least one adjustable tuning element of an impedance matching network to at least a first impedance setting, and the impedance matching network includes a first node adapted for coupling to a radio frequency (RF) power generator, a second node adapted for coupling to an electrode within the plasma processing chamber, and the at least one adjustable tuning element. Delivering, by use of the impedance matching network, RF power to an electrode disposed within the plasma processing chamber, while the first tuning algorithm is being executed by the match controller, which causes gases disposed within the plasma processing chamber to form or maintain a plasma that has a first load impedance. Implementing a second process recipe step of the plasma processing recipe that includes executing, by use of the match controller, a second tuning algorithm that sets the at least one adjustable tuning element to at least a second impedance setting. Then continuing to deliver, by use of the impedance matching network, RF power to the electrode disposed within the plasma processing chamber. Further adjusting at least one plasma processing variable that causes the first load impedance to change to a second load impedance, while continuing to deliver of RF power while the second tuning algorithm is being executed by the match controller, based on the adjusted at least one plasma processing variable.

Embodiments of the disclosure include an impedance matching network adapted for coupling between an RF power generator and a plasma processing chamber. The impedance matching network includes a first node adapted for coupling to the RF power generator, a second node adapted for coupling to an electrode within the plasma processing chamber, and adjustable tuning elements for transforming at least one of a plurality of impedances at the second node to an output impedance of the RF power generator at the first node. The impedance matching network further includes a match controller coupled to the adjustable tuning elements, wherein the match controller controls setting an impedance transformation with at least one of the adjustable tuning elements by use of at least one of a plurality of tuning algorithms stored in a memory.

BRIEF DESCRIPTION OF THE DRAWINGS

So that the manner in which the above recited features of the present disclosure can be better understood in detail, a more particular description of the disclosure, briefly summarized herein, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
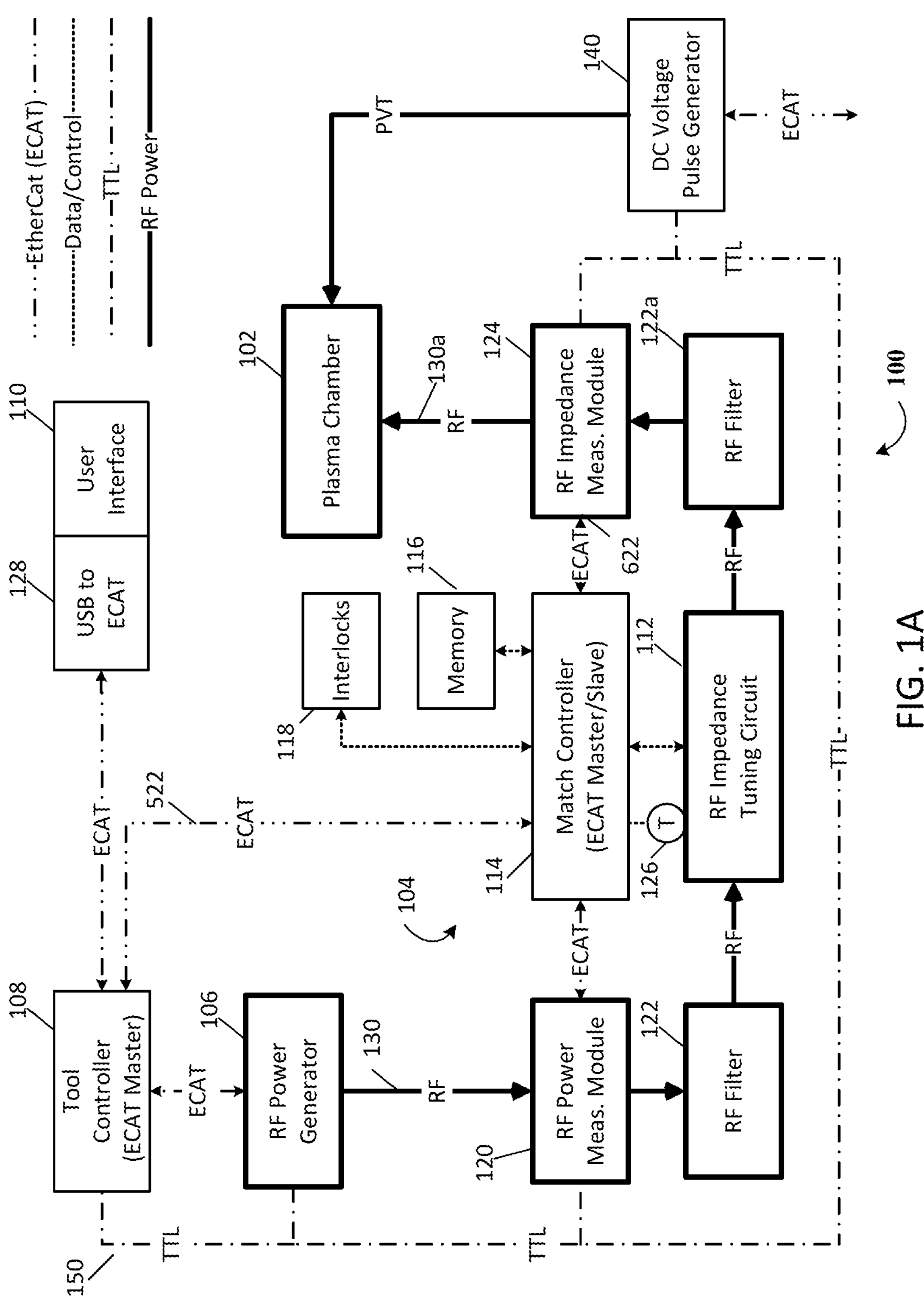
FIG. 1A illustrates a schematic block diagram of a semiconductor wafer plasma processing system, according to one or more embodiments of this disclosure.

Embodiments of the present disclosure generally relate to apparatus and methods for providing an RF impedance matching network with flexible tuning algorithms loadable in real time for use during different portions of a process recipe that may be used during the manufacture of semiconductor devices or other useful products. More specifically, embodiments provided herein generally include apparatus and methods for delivering and using flexible RF impedance matching network tuning algorithms to control the delivery of RF power to a complex load formed within a plasma processing chamber during different phases of a plasma processing recipe used to process a substrate therein. These RF impedance matching network tuning algorithms may be used during different portions of a process recipe executed in the plasma processing chamber as the load impedance changes due to variation in one or more plasma processing parameters. The RF impedance matching network tuning algorithms are configured to take into consideration measured parameter variations, e.g., RF voltage, current and frequency, and make adjustments to the tuning elements of the RF impedance matching network and/or RF power from the RF power generator. In addition, anticipatory adjustments may be provided to the slower response tuning elements of the RF impedance matching network to provide for smoother and more efficient application of the required RF power (voltage) to the complex load formed in the plasma processing chamber. Modifications to other process algorithms based upon historical learning may also benefit and improve the overall operation of the plasma process performed in the plasma chamber.

Tuning algorithms utilized by a matching network may be stored in fast and/or slower module memories depending upon the applications and requirements thereof. The fast module memory may be associated with the match controller but may have a smaller memory capacity, and the slower memory may be associated with the tool controller having larger memory capacity. Since the match controller has very low time latency associated with the match tuning elements it controls, this may be the most effective location for the tuning algorithms due to the often-rapid fluctuations in the load impedance experienced during most plasma processing recipes. However, it is contemplated and within the scope of this disclosure that tuning algorithms stored in the match controller memory may be easily and rapidly changed (replaced) and/or updated with replacement tuning element control algorithms stored in the slower tool controller memory. In some embodiments, the tool controller is configured to make decisions regarding which tuning algorithm is to be implemented by the match controller during different phases of a chamber plasma processing recipe based on stored historical data, settings within the chamber plasma processing recipe that is executed by the tool controller, due to detected changes in one or more plasma processing variables during the performance of the chamber plasma processing recipe, or other useful tuning algorithm selection techniques.

The term "algorithm" as used herein includes a series of instructions, which when executed by a processor, are configured to perform a method or activity described herein. In one example, a tuning algorithm is configured to tune the impedance of the variable impedance generating elements, such as the motorized variable capacitors to a desired position where tuning targets such as minimum reflected power, better power coupling, or others are achieved. The term "recipe" as used herein is a set of rules or instructions that precisely define a sequence of steps and operations for performing one or more functions defined in a plasma chamber. A recipe may select one or more tuning algorithms during one or more of the defined sequence of steps or operations. In one example, based on process conditions, substrate, and chemistry, a preferred algorithm can be selected and defined in a recipe that, which when executed during the manufacturing process, achieves, for example, repeatable and optimized reflected power back to the RF generator. A plurality of predefined and/or "learned" tuning algorithms may be stored in either or both of the fast and slower module memories. A tuning recipe may pick/choose appropriate tuning algorithms stored in either or both memories and transfer the selected tuning algorithms from the slower memory to the faster memory as required. One will note that the tool controller will also include one or more "process recipes" that include a sequence of wafer processing steps that each include process variable settings, which when executed during a process performed in a process chamber produces repeatable substrate (e.g., semiconductor wafer) processing results. Since the storage capacity of the faster memory may be restricted, algorithms no longer required for the process may be replaced with subsequent algorithms required to complete the manufacturing process. Thus, maximizing operational flexibility and minimizing memory storage capacity requirements. The term "fast" or "slow" memory is intended to describe the ability of a controller to transfer and/or implement an algorithm during processing. In one example, a controller that includes a fast memory can be configured to implement an algorithm that is able to make adjustments on the nanosecond (ns) time scale, and a controller that includes a slow memory can be configured to implement an algorithm that is able to make adjustments on the microsecond (μs) time scale.

Embodiments of the present disclosure relate to a plasma processing system comprising independent and autonomous circuit functions having application specific sensor interfaces, data processing, and calculation and control circuit modules. Independent communications between circuit module functions using high speed and secure communication protocols that provide for communications between circuit modules, tool controllers and supervisory systems. Communications may be provided with industrial quality software protocols such as, for example but is not limited to, Ethernet for Control Automation Technology (EtherCAT) or (ECAT). EtherCat communications enables fast and easy circuit and system updating and maintenance in the field, and efficient testing and qualification during the process of manufacturing systems. Sensor and controller circuit testing, qualification and firmware/software updating may be done remotely using File over EtherCAT (FoE), which may reduce maintenance, calibration and logistics costs. Each EtherCat communications interface may have a unique address and be adapted to communicate sensor and control data to the other EtherCat communications interfaces, thereby making available all process information to all circuit functions within a system.

RF matching networks having flexible tuning algorithms may be uploaded to the match controller on the fly, before or during the processing of a semiconductor wafer in a plasma chamber. The tool controller overseeing tuning performance of a tuning recipe can update the tuning algorithms of the tuning recipe on the fly based upon previous process runs or steps. The tuning algorithms may be uploaded to the match controller and/or tool controller using file over EtherCAT (FoE) or other data transfer protocols. The tuning algorithms of the tuning recipe may be uploaded from a user interface such as a personal computer (e.g., laptop PC) using, for example but not limited to, USB, RS-232, RS-422 or other serial communications protocols. Different tuning algorithms may be stored in a match controller memory, tool controller memory and/or user personal computer (PC) memory. Based upon recipe conditions and process requirements, different tuning algorithms may be used for different recipes, process steps, wafer types and the like.

RF Impedance and RF power sensor information from the independent RF impedance and power circuit modules may be shared throughout the plasma processing system(s) for diagnostic purposes and algorithm pre-learning and/or refinement in process speed, quality, and/or efficiency. Circuit modules may provide sensor information that may be reusable for impedance matching unit design extendibility. Sensor circuits may be adapted for use with other impedance matching units and/or operate at other RF frequencies and load impedances. Each sensor circuit module may have a unique communications address and may be accessible with its data available to all other plasma processing system circuit modules, controllers and process data logging in a manufacturing supervisory system.

In some embodiments, sensor data of a plasma process may be used for learning purposes and recorded, then the sensors may be disconnected and the recorded learning process data used in place of the sensor data. The process control algorithm settings, e.g., impedance matching element setting positions and RF power process levels may be stored in a tool controller and subsequently used by the tool controller for a plurality of different tuning recipes. Thus, well established and consistent manufacturing processes may be performed without the necessity of sensor monitoring of the manufacturing processes. This is especially advantageous for a large number of chamber plasma processes occurring during a semiconductor device manufacturing day. The same tuning recipe need not be applied to all of the plasma processing systems at the same time, and may be modified with different process control algorithms depending upon the intended semiconductor manufacturing process required. Different plasma processing tuning recipes may be distributed among the manufacturing plasma chamber systems depending upon the manufacturing requirements for different semiconductor products.

Operational information, e.g., RF sensor values and tuning element positions, may be evaluated during a semiconductor manufacturing process. The operational process information may be recorded (stored in a memory) for subsequent evaluation and possible refinement for performing future manufacturing processes. For example, the plasma chamber condition can change over time, and different or modified RF match tuning algorithms may be implemented with the sum running time to reduce variations. Similarly configured plasma processing chambers may have slight differences which may cause undesirable excess RF reflected power, causing process result variations which can be corrected by adjustments made to a tuning algorithm. Different and adapted tuning algorithms may also be used to reduce chamber-to-chamber variations. Different tuning algorithms may be selected for different process steps when creating a chamber plasma processing recipe. Other examples may be: 1) the use of predetermined impedance match settings (tuning element positions) as a starting match point to compensate for known changes in the load impedance during execution of a chamber plasma processing recipe, 2) anticipating future impedance match settings while taking into consideration the speeds (time) at which the tuning element positions can change to a desired match setting, and 3) making anticipatory tuning element position changes (impedance match points) to compensate for a known change in the load impedance so as to damp and/or reduce the initial high reflected power that may be caused by the load impedance change.

Referring now to the drawings, the details of example embodiments are schematically illustrated. Like elements in the drawings will be represented by like numbers, and similar elements will be represented by like numbers with a different lower-case letter suffix.

Referring to FIG. 1A, depicted is a schematic block diagram of a semiconductor wafer plasma processing system, according to specific example embodiments of this disclosure. The plasma processing system, generally represented by the numeral 100, may generally comprise a plasma chamber 102 for processing substrates therein, an RF power generator 106, an RF impedance matching network 104, a tool controller 108 and a user interface 110 having a communications interface 128. The plasma processing system 100 may further comprise an RF power measurement circuit module 120, an RF filter 122, an RF impedance matching network 104 comprising an RF tuning circuit 112 and a match controller 114, another RF filter 122*a*, an RF impedance measurement circuit module 124, and a DC voltage pulse generator 140.

Figure 1B:
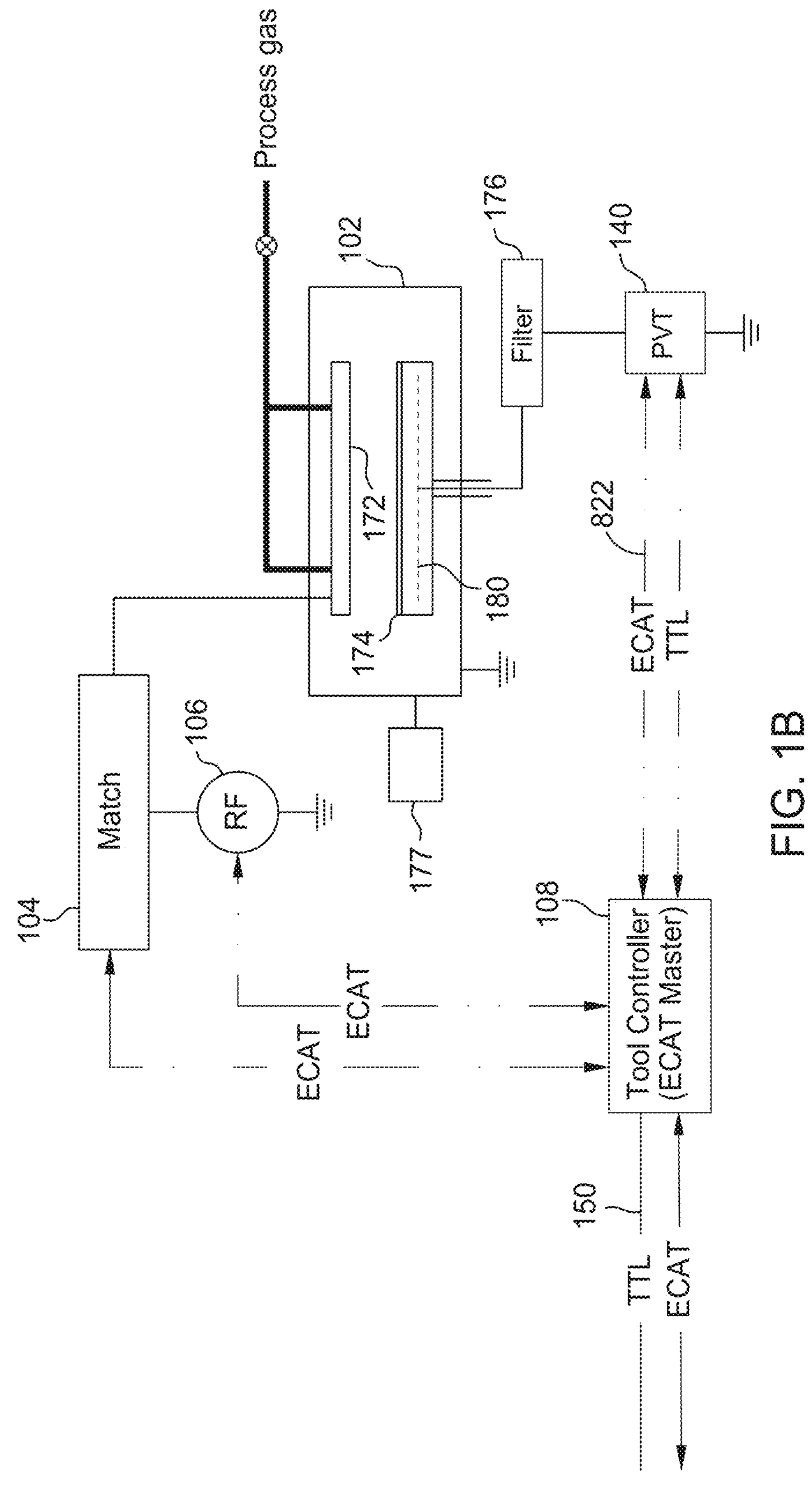
FIG. 1B illustrates a schematic diagram of a plasma processing chamber and associated plasma generating equipment that form at least part of the plasma processing system illustrated in FIG. 1A, according to one or more embodiments of this disclosure.

FIG. 1B, illustrates a schematic block diagram of the plasma processing chamber 102 and associated plasma generating equipment, according to one or more embodiments of the disclosure. A plasma processing chamber 102 includes impedance matching unit 104, RF power generator 106, a DC pulse generator 177, an RF electrode 172 and a work piece pedestal 174. The RF electrode 172 is coupled to an impedance matching unit 104 which receive RF power from an RF power generator 106. In one example, the RF electrode 172 could be a showerhead that is used to form a capacitively coupled plasma in the plasma processing chamber 102, or even a multi-turn coil that is used to form an inductively coupled plasma in the plasma processing chamber 102. The impedance matching unit 104, RF power generator 106 and DC pulse generator 177 are monitored and controlled over individual EtherCat communications lines associated therewith. The information from and control of these elements may be processed in a tool controller 108 which communicates to each one over the aforementioned individual EtherCat communications lines. For example, the RF voltage detected with an RF voltage sensor 178 may be utilized by both of the impedance matching unit 104 through the tool controller 108. The output of the DC pulse generator 177 is coupled to an embedded electrode 180 in the work piece pedestal 174. The embedded electrode 180 can be an electrostatic chucking electrode that is disposed within an electrostatic chuck within the work piece pedestal 174. An RF filter 176 is coupled between the DC pulse generator 177 and the embedded electrode 180 and is used to substantially block RF energy from getting into the DC pulse generator 177. The DC pulse generator 177 may be adapted to deliver asymmetric DC pulses to the embedded electrode 180 for control of the plasma sheath formed over the surface of the substrate. In some embodiments, the plasma processing chamber 102 is configured for plasma-assisted etching processes, such as a reactive ion etch (RIE) plasma processing. The plasma processing chamber 102 can also be used in other plasma-assisted processes, such as plasma-enhanced deposition processes (for example, plasma-enhanced chemical vapor deposition (PECVD) processes, plasma-enhanced physical vapor deposition (PEPVD) processes, plasma-enhanced atomic layer deposition (PEALD) processes, plasma treatment processing, plasma-based ion implant processing, or plasma doping (P LAD) processing.

The RF impedance matching network 104, RF power generator 106, RF power measurement circuit module 120, RF impedance measurement circuit module 124, DC voltage pulse generator 140, tool controller 108 and user interface 110 may communicate with each other, to control and monitor the delivery of RF power to the plasma chamber 102 during semiconductor substrate processing, using protocols such as, for example but is not limited to, Ethernet for Control Automation Technology (EtherCAT) or (ECAT). Other industrial communications protocols may also be effectively used and are contemplated herein. For purposes of discussion herein the primary means of communications (protocols) used, for control and monitoring, may be EtherCat. EtherCAT is a high-performance, low-cost, easy to use Industrial Ethernet technology with a flexible topology. EtherCat uses an Ethernet packet form of communications but is much faster and more robust than common Ethernet systems and other similar communication protocols. It is specifically applicable to industrial manufacturing processes requiring a high degree of security and reliability while maintaining high data and control throughput in real time. Since EtherCat is a serial communications protocol with inherent latency delays, a directly coupled signal "TTL" may be utilized for triggering of microsecond sampling and blanking operations during DC pulse generation by the DC voltage pulse generator 140.

The impedance matching network 104 may comprise the RF tuning circuit 112, the match controller 114 for controlling the RF tuning circuit 112, a memory 116 coupled to the match controller 114, safety and operating interlocks 118, an RF power measurement circuit module 120 having an input coupled to an output of the RF power generator 106, an RF filter 122 coupled between the RF power measurement circuit module 120 and an input of the RF tuning circuit 112, another RF filter 122*a* coupled to the output of the RF tuning circuit 112, an RF impedance measurement circuit module 124 and a temperature sensor 126. The match controller 114 may include a communications interface adapted for a communication protocol such, as for example but not limited to, EtherCat communications. A synchronizing or trigger (TTL) signal 150 may be provided to the circuit modules as indicated and may be adapted to function (programmable) as either a passive (receive) or active (transmit) signal node on a single TTL "party line." The TTL signal 150 is a hardwired logic circuit that has substantially no communications latency delay and may be used to control RF power blanking, sensor value sampling, DC pulse timing, and other critical timing relationships occurring in the nanosecond or even picosecond ranges. All of the aforementioned circuit modules are accessible between each other for monitoring and control through EtherCat communications, and the TTL signal 150.

A user interface 110, e.g., computer (laptop), may communicate with a tool controller 108 (EtherCat master) using a USB to EtherCat adapter 128 or may be coupled to the tool controller 108 using RS-232, Wi-Fi or other communications protocols, not shown. This communications link may give the user interface 110 access to all sensor information and control of the plasma processing system 100 via, for example but not limited to, EtherCat communications coupled to each subsystem thereof. RF power from the RF power generator 106 may be coupled over high voltage coaxial cable 130, e.g., LMR-600 to the RF power measurement circuit module 120, and RF power from the impedance matching unit 104 may be coupled over coaxial cable 130_a_ to the plasma chamber 102 RF coils (not shown).

Referring to FIG. 1B, the DC voltage pulse generator 140 may comprise a pulse high voltage DC supply that is communication with an EtherCat communications interface. The DC voltage pulse generator 140 is generally configured to provide a voltage waveform that includes asymmetric DC voltage pulses (e.g., non-sinusoidal pulses) to an electrode (e.g., electrode 180) disposed within the plasma processing chamber 102. The DC voltage pulses can include a plurality of voltage pulse characteristics, such as a voltage pulse repetition rate, voltage pulse on-time during a voltage pulse period, and a peak positive or negative voltage applied to the electrode during the on-time of each voltage pulse. In some embodiments, the DC voltage pulses may be generated from about minus (−) 5000 volts to about plus (+) 5000 volts at a pulse repetition rate of from about 100 kHz to about 500 kHz, with pulse on-times provided by the high voltage DC supply of from about five (5) percent to about ninety (90) percent of the pulse period. In one example, the DC voltage pulses includes a minus (−) 5000 volts peak applied voltage that are applied at a pulse repetition rate of about 400 kHz, and pulse on-time that is about 85 percent of the pulse period (e.g., 2.5 μs). During plasma processing it is typical for the voltage waveform, which includes the asymmetric DC voltage pulses, to be provided while the RF power provided from the RF source is used to generate a plasma in the processing region of the plasma processing chamber 102.

DC pulse delivery characteristics for the DC voltage pulse generator circuit module 140 may be stored in a memory of the DC voltage pulse generator 140 and accessed therefrom as required. The delivery and characteristics of the DC voltage pulses (i.e., DC pulse waveforms) provided by DC voltage pulse generator circuit module 140 may also be controlled by signals provided from the tool controller 108 and/or by use of a TTL level signal provided from one or more of the system components. The control of the DC voltage pulse generator may be performed by the tool controller 108 and/or user interface 110 over EtherCat communications lines 822 to the Ethernet communications interface. The synchronizing or trigger (TTL) signal 150 may be provided to the DC voltage pulse generator circuit module 140. The TTL signal 150 may control DC voltage pulse generation profiles according to the DC voltage pulse generator algorithms that may be stored in the memory of the DC voltage pulse generator circuit module 140.

Radio Frequency Impedance and Power Determination

Radio frequency (RF) impedance is determined by the RF voltage V(t), RF current I(t), phase angle θ and frequency of an RF waveform. RF voltage and current sensors measure the RF voltage V(t) and RF current (I(t), and phase angle θ is determined therefrom. Frequency is measured with a frequency detector. Phase angle is the lead or lag times between the RF voltage V(t) and RF current I(t) waveforms at a given harmonic frequency, but fundamental frequency is often considered, and is expressed in degrees θ. RF power P(t) is the product of voltage and current, or $P(t)=V(t)*I(t)$, while the respective RMS (root-mean-square) values after sensor detection are $P=V*I*\cos\theta$, where θ is the phase angle between the voltage and current waveforms. Using Ohm's Law $Z(t)=V(t)/I(t)$ or Z may be expressed as $Z=R+jX$, where $R=Z\cos\theta$ and $jX=Z\sin\theta$. $jX=j\omega L-j/\omega C$, where $\omega=2\pi f$, f is in frequency, C is in farads and L is in henrys. R is resistance in ohms and jX is reactance in ohms, where +jX is inductive reactance and −jX is capacitive reactance. Power is frequency independent and impedance is frequency dependent, when analyzing in the frequency domain.

Figure 2:
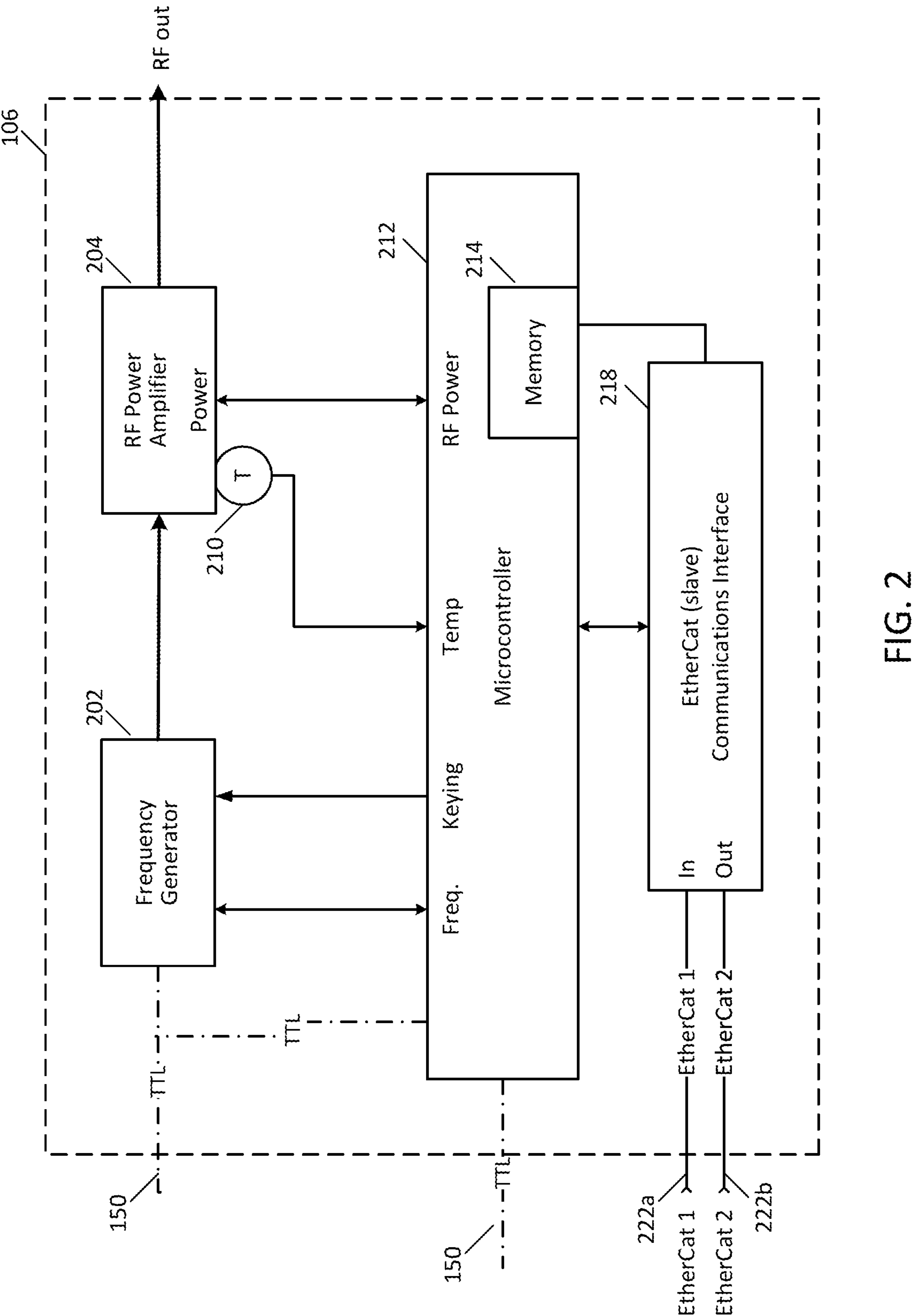
FIG. 2 illustrates a schematic block diagram of an RF power generator, according to one or more embodiments of this disclosure.

Referring to FIG. 2, depicted is a schematic block diagram of an RF power generator circuit module 106, according to an embodiment of this disclosure. The RF power generator circuit module 106 may comprise a frequency generator 202, an RF power amplifier 204, a temperature sensor 210, a microcontroller 212 having a memory 214, and an EtherCat communications interface 218. The microcontroller 212 is adapted to set the frequency of the frequency generator 202 and the RF power output of the RF power amplifier 204. The RF power generator circuit module 106 may be adapted to provide RF power at frequencies from about 100 kHz to about 200 MHz. RF power output from the RF power generator circuit module 106 may be from about 100 to about 40,000 Watts (W). The RF power may also be pulsed on and off at a pulse rate of from about one Hz to about 100 kHz, with an on/off duty cycle from about one (1) percent to about 99 percent.

Figure 3:
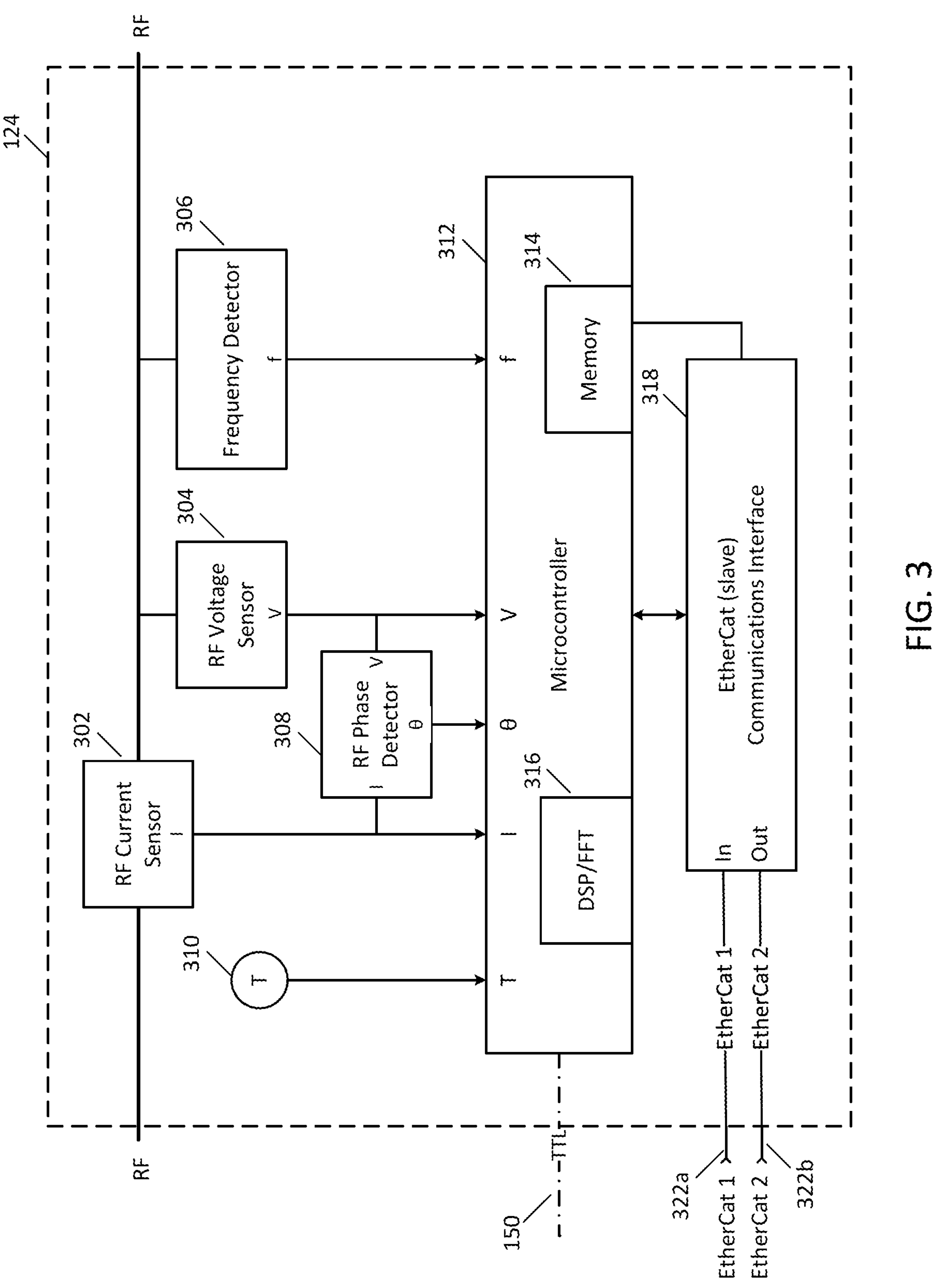
FIG. 3 illustrates a schematic block diagram of an RF impedance measurement module, according to one or more embodiments of this disclosure.

Referring to FIG. 3, depicted is a schematic block diagram of an RF impedance measurement circuit module, according to an embodiment of this disclosure. The RF impedance measurement circuit module, which may include at least one of the RF impedance measurement circuit modules 120 and 124, and may comprise an RF current sensor 302, an RF voltage sensor 304, an RF frequency detector 306, an RF phase detector 308, a temperature sensor 310, a microcontroller 312 having a memory 314 and digital signal processing (DSP)/fast Fourier transform (FFT) 316 capabilities, and an EtherCat communications interface 318. In some embodiments, field programmable gate arrays (FPGAs) or application-specific integrated circuits (ASICs) may be used for faster speed and better performance. The EtherCat communications interface 318 may be adapted for EtherCat-P which may provide DC power for the electronics of the RF impedance measurement circuit module 120, 124. The synchronizing or trigger (TTL) signal 150 may be provided to the microcontroller 312 as an alert to take RF current, RF voltage, RF phase and frequency samples at each trigger pulse from the TTL signal 150. Then the microcontroller 312 may store these samples in the memory 314 for later use, computation and/or communications through the Ethernet communications interface 318. The TTL signal 150 may also be used as a "blanking signal" to prevent sensor readings during a DC pulse from the pulse voltage generator 140.

The RF current sensor 302 senses the RF current I(t) and the RF voltage sensor 304 senses the RF voltage V(t). The RF current I(t) and voltage V(t) are received by analog inputs of the microcontroller 312 and may then be converted into digital representations thereof. The phase angle θ(time difference between I(t) and V(t)) may be determined with the phase detector 308 or may be determined after I(t) and V(t) have been converted into digital representations. Either way the phase angle θ can be converted into a digital format by the microcontroller 312. The frequency detector 306 provides frequency information to the microcontroller 312 in a digital format, e.g., from a time-based digital counter. Once RF current, voltage, phase and frequency are known the impedance may be calculated as well as the RF power going into the load (plasma processing chamber), as described hereinabove, with the DSP/FFT 316 function of the microcontroller 312. The memory 314 may be adapted to store the real time impedances and power calculated and may also be used to store calibration coefficients for the RF current and voltage sensors, and the frequency and phase detectors. Also, sensor, detector, impedance and power information may be presented in digital format from the microcontroller 312 to the EtherCat communications interface 318 for use (information and control) by the plasma processing system 100 and other subsystems thereof.

Impedance Matching Unit Control and Tuning

Figure 4A:
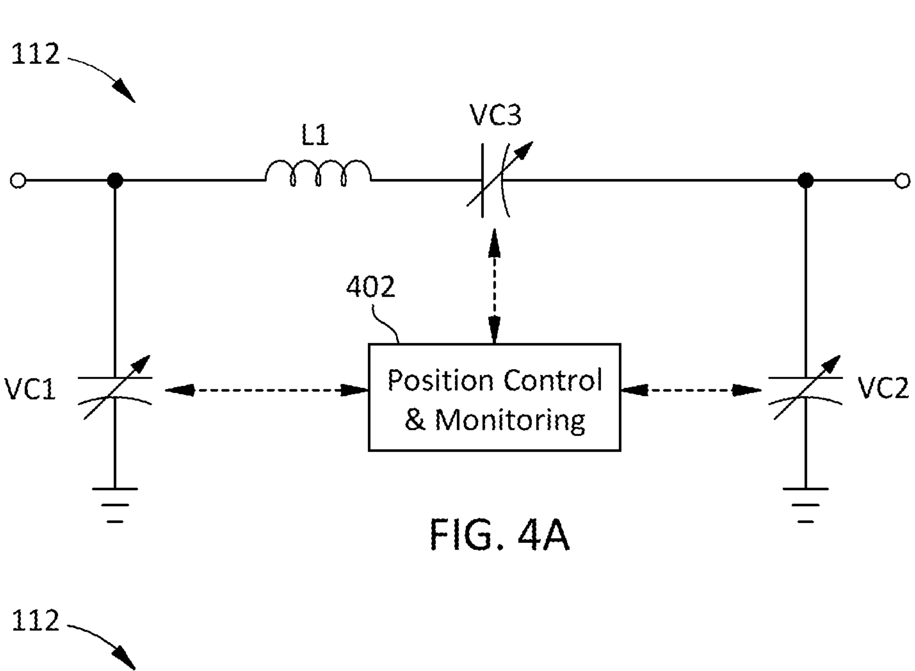
FIGS. 4A, 4B and 4C illustrate schematic diagrams of RF tuning circuits, according to one or more embodiments of this disclosure.
Figure 4B:
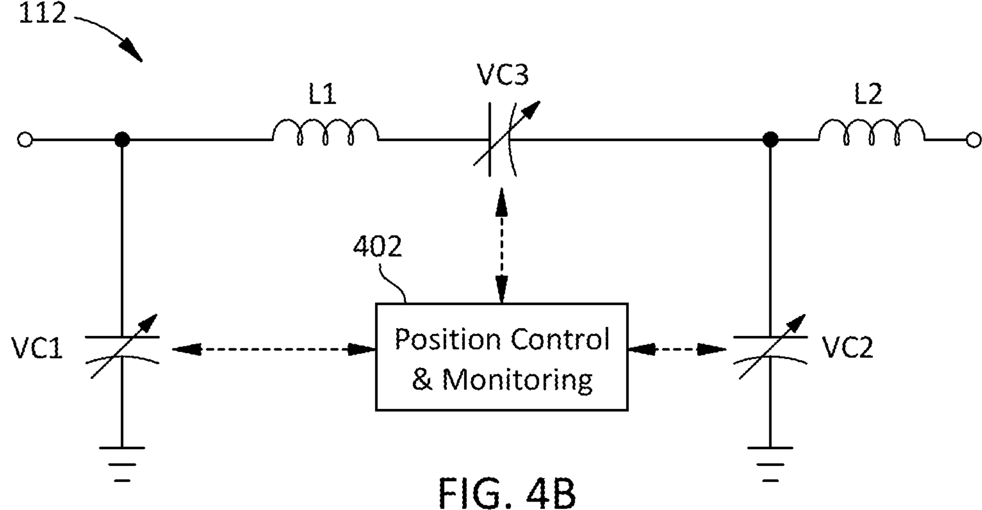
Figure 4C:
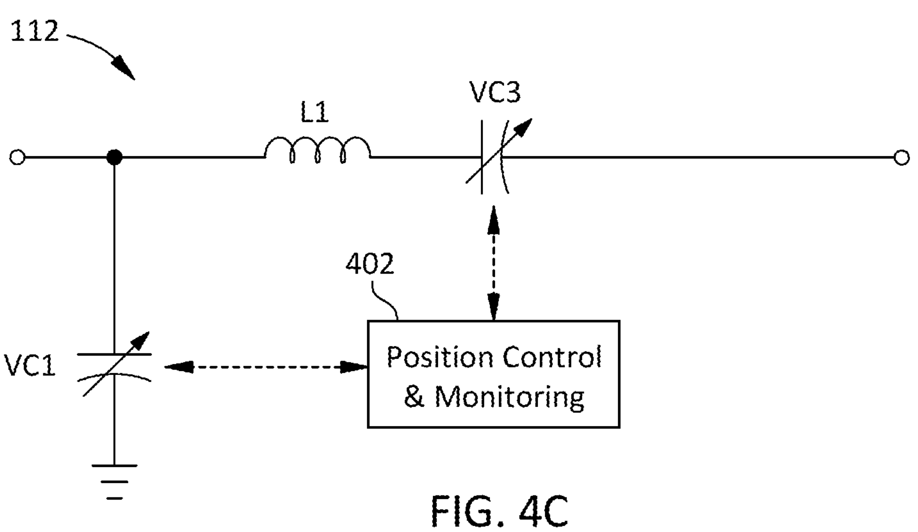

FIGS. 4A, 4B and 4C each include schematic diagrams of RF tuning circuits 112, according to one or more embodiments of the disclosure. FIGS. 4A and 4B show three variable capacitors VC1, VC2 and VC3, and FIG. 4C shows two variable capacitors VC1 and VC3, e.g., motorized vacuum variable capacitors, and are example representations in combination with inductor L1 (and L2) for the RF tuning circuit 112. The variable capacitors VC1, VC2 and VC3 may have a capacitive range, but are not limited to, from about 3 pF to about 5000 pF. L1 is an inductor and may have an inductive range of, but is not limited to, about 0.01 μH to about 1000 μH. VC3 may be used to adjust a target frequency from about 100 kHz to about 250 MHz, and VC1 and VC2 may be used to tune to a target impedance. In some embodiments, especially complex loads for lower frequencies, the RF circuit schematic configuration shown in FIG. 4B may be implemented. An additional inductor L2 may be added for adjusting the RF tuning circuit 112 to a desired value. Inductor L2 may be in a range of, but is not limited to, about 0.01 μH to about 1000 μH. A low pass Pi matching circuit is shown in FIGS. 4A and 4B. In some embodiments, the RF tuning circuit 112 may be an L type circuit as shown in FIG. 4C, using only two motorized vacuum variable capacitors, e.g., VC1 and VC3.

The capacitance and/or inductance values of the variable elements, e.g., VC1, VC2, VC3; may be controlled and monitored by a position control and monitoring circuit 402 for each variable element (one shown). Additional capacitors and/or inductors may also be switched into the matching circuit as required (not shown). A motor position actuator of the position control and monitoring circuit 402 may also include a position sensor that indicates the mechanical position of the adjustable element, e.g., amount of shaft rotation of the variable vacuum capacitor or a synchronized stepper motor position count after minimum and maximum rotation positions have been determined (detection of maximum and minimum clockwise and counter-clockwise shaft rotations). Position values may be correlated in a capacitance (or inductance)—position value table so that capacitance and/or inductance values may be monitored and set to a desired position based upon a required capacitance/inductance value. Tuning element position values may be used for monitoring and presetting tuning element positions according to the teachings of this disclosure.

Figure 5:
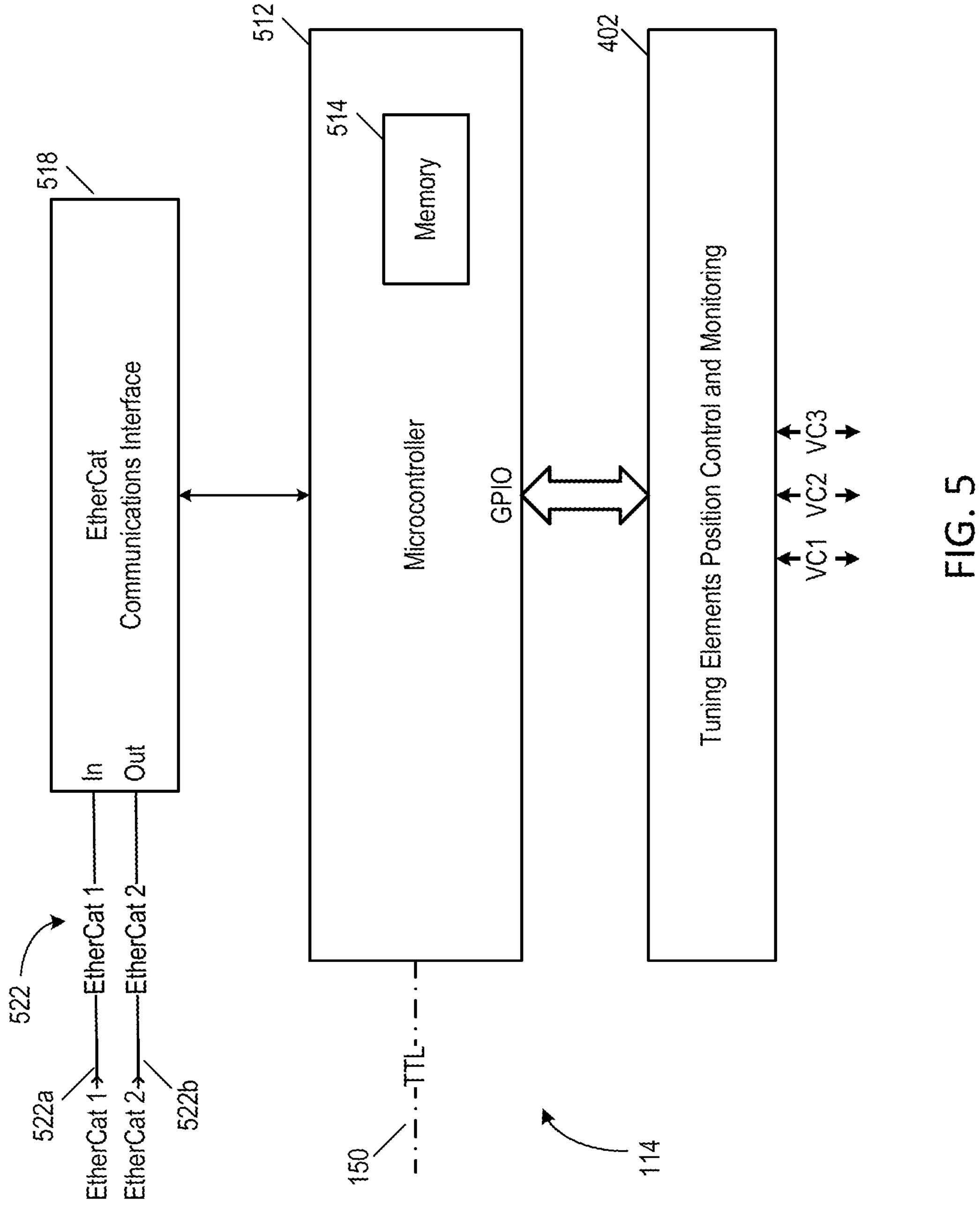
FIG. 5 illustrates a schematic block diagram of a match controller, according to one or more embodiments of this disclosure.

Referring to FIG. 5, depicted is a schematic block diagram of a match controller 114, according to an embodiment of this disclosure. The match controller 114 may monitor and control the variable tuning elements (e.g., variable capacitors VC1, VC2 and VC3) of the RF tuning circuit 112. The match controller 114 may comprise a microcontroller 512, a memory (volatile and/or non-volatile) 514, stepper motor drivers and position sensors 402 (FIGS. 4A-4C), and an EtherCat communications interface 518. The microcontroller 512 can include a processor that is configured to execute the instructions found within the tuning algorithm to adjust and control at least one of the capacitance and inductance values of the variable elements (e.g., VC1, VC2, VC3) within the RF tuning circuit 112. Via EtherCat communications, the microcontroller 612 may receive plasma chamber impedance information from the RF impedance measurement circuit module 124 and/or the RF power measurement circuit module 120. Then from this impedance information control the positions of the variable tuning elements (e.g., variable capacitors VC1, VC2 and VC3) of the RF tuning circuit 112 to complete an impedance match between the RF power generator 106 and plasma chamber 102. The EtherCat communications interface 518 may provide downloaded match tuning algorithms for storing in the memory 514. The TTL signal 150 may initiate a match tuning event or inhibit one depending the match tuning algorithm in operation. Tuning latency issues caused by the slowness of the mechanical movements of the variable tuning elements may be compensated for by, for example but are not limited to, presetting and anticipatory adjustments to minimize adjustment latency times of tuning element control in an impedance matching network during a semiconductor manufacturing process.

Plasma Processing Example(s)

In an effort to control the processes performed in a plasma processing chamber 102, a chamber plasma processing recipe is typically generated from input provided by a user, such as process engineer. The chamber plasma processing recipe is controlled by a process recipe algorithm that is stored in memory and executed by use of a processor of the tool controller 108. The chamber plasma processing recipe will include a series of processing steps that are each used to define and control one or more substrate processing variables during each processing step, such that when the processing steps are combined together a desired process result is achieved on a substrate. The chamber plasma processing recipe includes a plurality of the processing steps that are generally referred to herein as process recipe sub-steps, or sub-steps. In general, the substrate processing variables will include, but are not limited to, chamber pressure, gas flow rate, gas flow composition, PV waveform bias voltage, PV waveform pulse frequency, PV waveform pulse on-time, RF power level, RF pulse frequency, substrate temperature, or other useful processing parameters. As the various processing steps of the chamber plasma processing recipe are performed, the tool controller 108 will provide or cause commands to be provided to various hardware and electrical components within the plasma processing chamber 102 that are used to execute aspects of the chamber plasma processing recipe and achieve the desired processing results on a substrate. The commands provided from the tool controller 108 can be supplied by use of the various EtherCat communications interfaces and TTL signal lines that enable the communication between the various hardware and electrical components within the plasma processing chamber 102.

As part of the process of controlling the various processing parameters defined in the chamber plasma processing recipe, the tool controller 108 is also configured to cause the match controller 114 to implement tuning algorithms that control the performance of the RF match 104 during processing. As noted above, these tuning algorithms may be used during different portions of a chamber plasma processing recipe executed in the plasma processing chamber as the load impedance changes due to variation in one or more plasma processing parameters. The tuning algorithms are configured to take into consideration measured parameter variations, e.g., RF voltage, current and frequency, and make adjustments to the tuning elements of the RF impedance matching network and/or RF power from the RF power generator. The tuning algorithms can be formed based upon historical learning, user derived settings, or attributes of the current process variables within a process recipe step so that the overall operation of the plasma process performed in the plasma chamber can be improved. In some embodiments, different RF tuning algorithms may be provided based upon RF source, DC voltage pulse source and match synchronization settings when using synchronizing or trigger (TTL) signals. Different RF power algorithms may be provided when using synchronizing or trigger (TTL) signals generated from the RF power generator circuit module 106, from the DC voltage pulse generator circuit module 140 or from an external trigger signal. RF power algorithms for controlling the RF power generator circuit module 106 may be stored in the memory 214 and accessed therefrom as required. These RF power algorithms may be transferred from the tool controller 108 and/or user interface 110 memories over EtherCat communications lines 222 to the Ethernet communications interface 218 and stored in the memory 214 of the microcontroller 212. The synchronizing or trigger (TTL) signal 150 may be provided to the frequency generator 202 and microcontroller 212. The TTL signal 150 triggering may be programmed with the RF power algorithm, as part of a process recipe, which may be stored in the memory 214.

Figure 6:
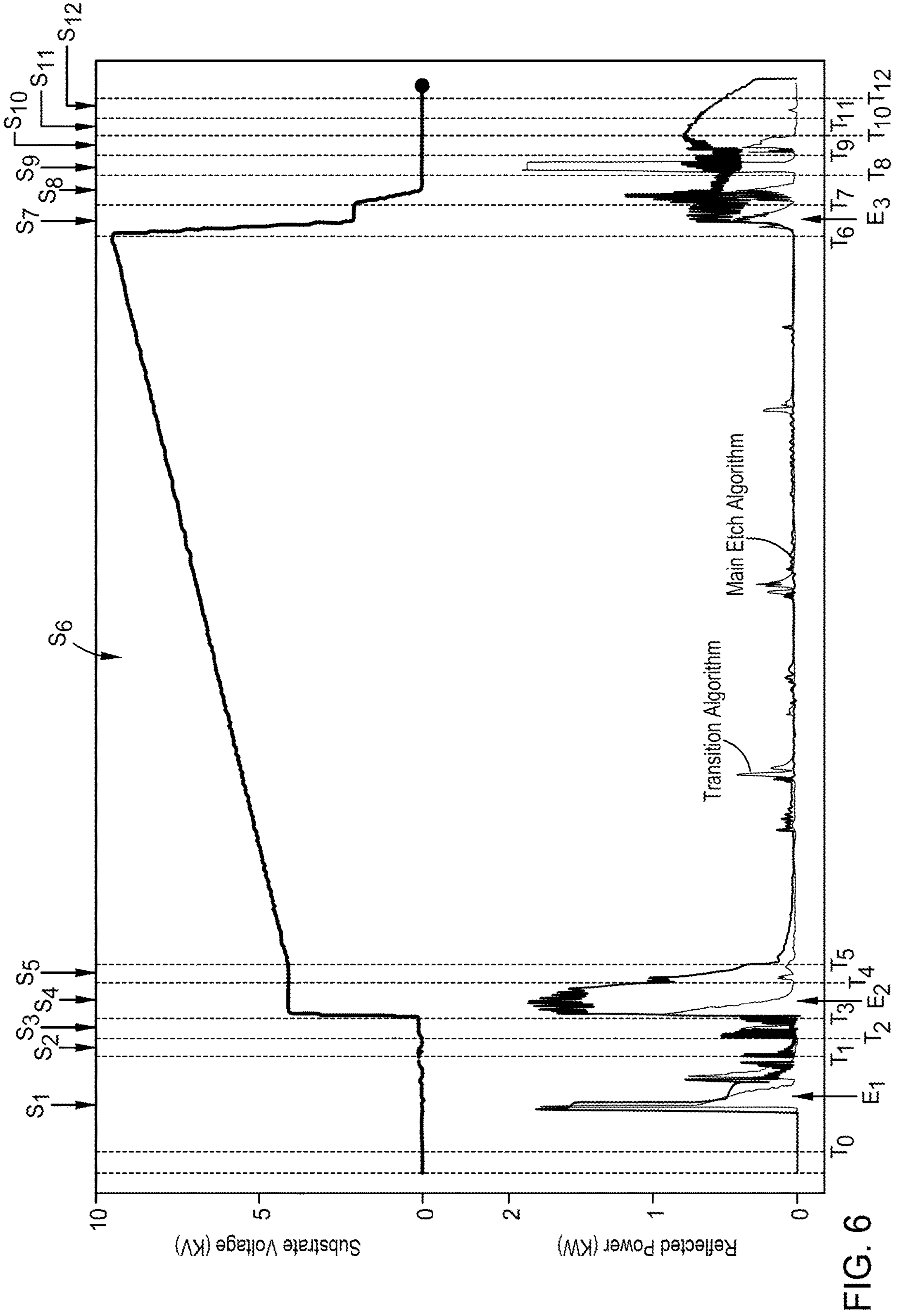
FIG. 6 illustrates a graphical plot of DC wafer voltage and reflected RF power versus time for a chamber plasma process recipe performed on a substrate in a plasma processing chamber, according to one or more embodiments of this disclosure.

FIG. 6 is a graphical plot of DC wafer voltage and reflected RF power versus time for a chamber plasma process recipe performed on a substrate in a plasma processing chamber 102, according to the teachings of this disclosure. In this example, the chamber plasma processing recipe includes a plurality of sub-steps, such as sub-steps $S_1$-$S_{12}$, that each include instructions, which are used by a tool controller 108 to adjust one or more plasma processing parameters during plasma processing to achieve a desired process result on a substrate. In general, the start and duration of each sub-step can vary based on the plasma process that is being performed in the plasma processing chamber 102. As illustrated in FIG. 6, the sub-step starting times include times $T_0$ to $T_{12}$, where $T_0$ is the start of the chamber plasma processing recipe, and the sub-step duration can be found by taking the difference between the starting times. For example, the duration of sub-step $S_6$ is the difference between time $T_6$ and $T_5$. As noted above, the execution of the chamber plasma processing recipe is typically performed by use of a process chamber algorithm running on the tool controller 108. The coded instructions found within the process chamber algorithm are used to cause the tool controller 108 and/or match controller 114 to select and use one or more tuning algorithms during each of the one or more of the sub-steps of the chamber plasma processing recipe. The one or more tuning algorithms may be stored in the tool controller 108 and/or match controller 114 memories and retrieved therefrom for implementation during one or more of the sub-steps. A process recipe performed in a plasma processing chamber 102 may use different tuning algorithms at different phases (e.g., sub-steps) of the process recipe that is executed by the tool controller 108.

Figure 7:
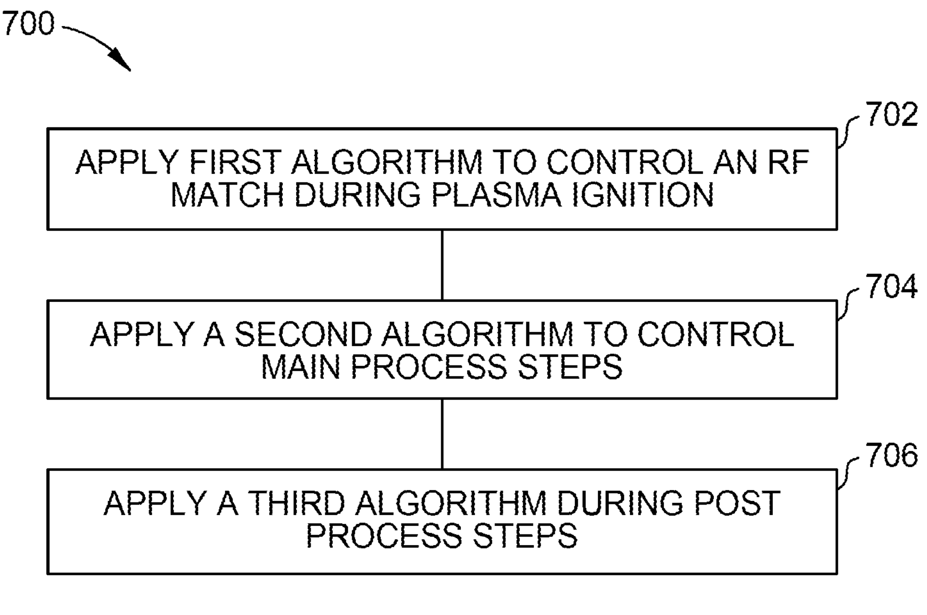
FIG. 7 illustrates a flow diagram of a tuning recipe that is coordinated with a plasma processing step during the plasma processing of a semiconductor wafer, according to one or more embodiments of this disclosure.

FIG. 7 illustrates a method 700 that includes a plurality of different tuning recipes that are selected based on information stored within one or more of the process recipe sub-steps of a chamber plasma processing recipe, such as the chamber plasma process recipe illustrated in FIG. 6. The series of different tuning recipes are coordinated with the execution of one or more of the plasma processing steps, such as sub-steps $S_1$-$S_{12}$, during the plasma processing of a semiconductor wafer. During each of the steps 702-706, a process control algorithm running within the tool controller 108 is used to define which tuning algorithm is to be implemented by the match controller. The implemented tuning algorithm generates control commands that are delivered to the position control and monitoring circuit 402 so that the capacitance and/or inductance values of the variable elements (e.g., VC1, VC2, VC3) within the RF tuning circuit 112 of the match network 104 are adjusted to compensate for the varying impedance of the complex load due to changes in the processing parameters in the plasma processing chamber. The tuning algorithm settings, e.g., impedance matching element setting positions may be stored in a tool controller or match controller and subsequently used at different phases within one or more of the steps 702-706 of plasma processing recipe, such as the one illustrated in FIG. 7.

In step 702, a first tuning algorithm is used for a plasma ignition portion of a process recipe step. For exemplary purposes, in step 702, the chamber plasma processing recipe selects a first tuning algorithm stored in memory to be used by the RF match during the delivery of RF power to the load during the first sub-step $S_1$. In one example, the first sub-step $S_1$ of the chamber plasma processing recipe causes a plasma to be ignited within the processing region of the plasma processing chamber. During the sub-step $S_1$ the tuning algorithm implemented by the match controller 114 adjusts the position of the variable tuning elements, such as the three variable capacitors VC1, VC2 and VC3 illustrated in FIG. 4A, to match to an impedance of the plasma chamber RF load. In one example, the first tuning algorithm is adjusted due to the chamber plasma processing recipe including an initial delivery of RF power to gases disposed in the processing region of the plasma processing chamber 102.

In step 704 of method 700, the chamber plasma processing recipe is used to select a second tuning algorithm, which is stored in memory, and is to be used by the RF match during the delivery of RF power to the load during one or more plasma processing steps, such as the second sub-step $S_2$. During the sub-step $S_2$ the tuning algorithm executed by the match controller 114 readjusts the position of the variable tuning elements, such as the three variable capacitors VC1, VC2 and VC3, to match a change in impedance of the load. In one example, the change in the impedance load is at least partially caused by the delivery of a plurality of DC voltage pulses of a voltage waveform provided by the DC voltage pulse generator 140 during at least the second sub-step $S_2$. In some cases, the second tuning algorithm is utilized for all of the remaining sub-steps (i.e., sub-steps $S_2$-$S_{12}$) of the chamber plasma processing recipe. However, in other embodiments, step 704 may be repeated multiple times using a different tuning algorithm for each sub-step to desirably control the delivery of RF power to the load in each of the sub-steps.

In step 706, during a post process step, a third tuning algorithm is utilized to allow a cleaning process recipe to be performed on the plasma processing chamber components when a substrate is not present in the processing chamber 102. During the post process step, the tuning algorithm executed by the match controller 114 readjusts the position of the variable tuning elements, such as the three variable capacitors VC1, VC2 and VC3, to match a change in impedance of the load. In one example, the tuning algorithm is adjusted due to the chamber plasma processing recipe, or an alternate chamber plasma processing recipe, includes an adjustment in the composition of the gases and/or RF power provided to the processing region of the plasma processing chamber 102.

Referring to FIG. 6, during the performance of the sub-steps within a chamber plasma process recipe one or more events, such as events $E_1$-$E_3$, may occur as one or more plasma processing parameters are adjusted during a sub-step. During sub-step $S_1$, during time $T_0$ and $T_1$, a high reflected power is experienced during a first event $E_1$ as a plasma is generated in the plasma processing chamber. The first tuning algorithm is thus used during the first event $E_1$ to adjust the variable tuning elements to a first setting to reduce the amount of reflected power experienced during this period of time. The tuning algorithm and its chosen variable tuning element settings may have been derived from prior testing or prior processing of substrates using the same chamber plasma process recipe. In some embodiments, the control of the adjustment of the set point of the variable tuning elements is controlled by the tuning algorithm to adjust for real time variations in plasma generated in the plasma processing chamber. In some cases, the speed with which the algorithm makes adjustments to the variable tuning elements or an amount of a damped response that is applied to the adjustments, for example, is set within each tuning algorithm that is applied by the match controller 114 during a sub-step to account for the characteristics of the event experienced during the sub-step. In one example, the speed with which the tuning algorithm reacts to a change in a detected amount of reflected power during the first event $E_1$ is greater than the speed that the tuning algorithm reacts to a change in a detected amount of reflected power during the third event $E_3$ due to the magnitude of change or differing rate of change in the amount of reflected power experienced during these sub-steps. In some embodiments, a process of setting the impedance of a variable tuning element (e.g., one or more of the capacitors VC1, VC2 and VC3), which is performed during the execution of a tuning algorithm, includes adjusting a set point of at least one of the variable tuning elements and/or the rate at which the set point is adjusted.

Figure 8:
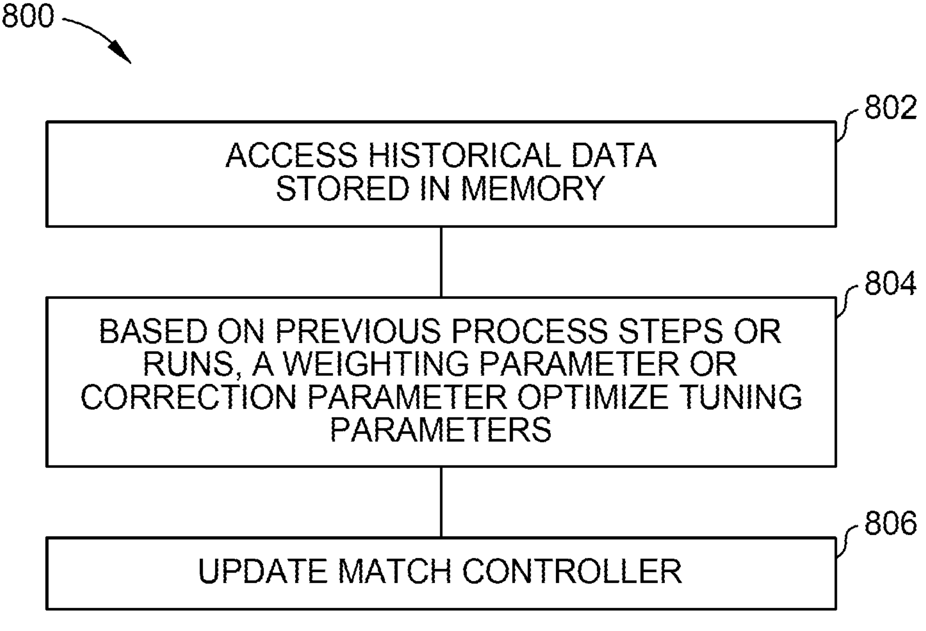
FIG. 8 illustrates a flow diagram of a process that can be executed by the tool controller overseeing the performance of a tuning algorithm, according to one or more embodiments of this disclosure.

Referring to FIG. 8, a method 800 that can be executed by the tool controller 108 overseeing the performance of a tuning algorithm, according to an embodiment of this disclosure. In the tool controller 108, learning based algorithms may be utilized to oversee and update match tuning performance of the tuning algorithms, and may update the tuning algorithms on the fly based upon the operations and results of previous process recipes or steps. In step 802, the tool controller accesses historical data stored in a memory that was completed in prior process step(s). The historical data can include information relating to reflected power and tuning speeds of variable impedance components of the RF match, which are used as a baseline or as the final tuning parameters that are implemented by the match controller 114. In step 804, a weighting parameter or correction parameter is empirically developed or provided by a user to optimize tuning gain and/or a tuning matrix based upon previous process steps or runs. In step 806, a new tuning algorithm may be generated, stored in memory of the tool controller 108 or match controller 114, and then implemented by the match controller during a process recipe during the next process run or next process step.

Figures 9, 10:
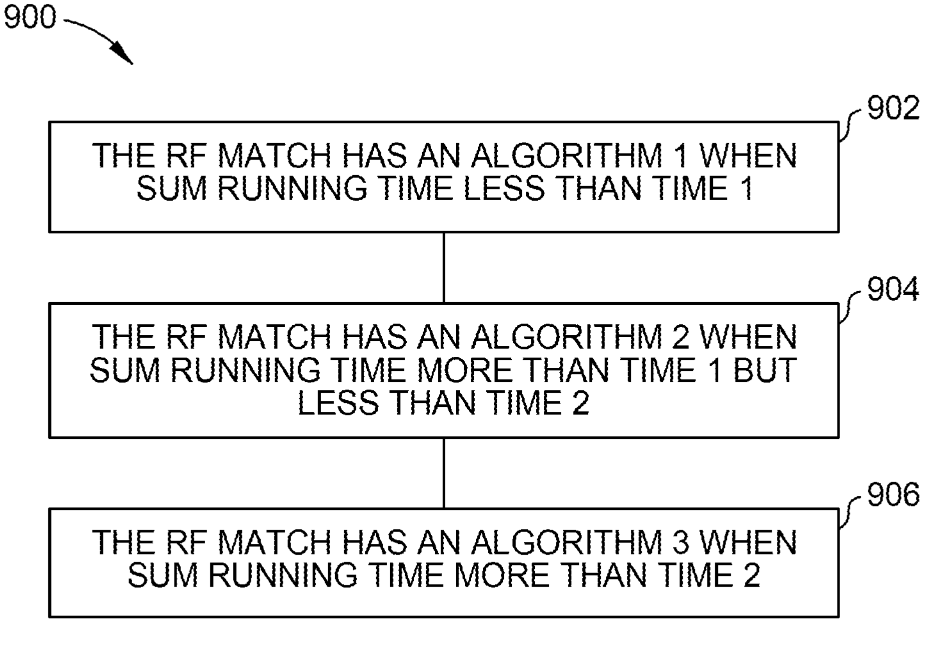
FIG. 9 illustrates a flow diagram for the selection of a tuning algorithm based upon plasma chamber conditions, according to one or more embodiments of this disclosure.
FIG. 10 illustrates a flow diagram that allows the tool controller to decide which of the stored match algorithms should be run during different semiconductor manufacturing process applications in different plasma processing chambers, according to one or more embodiments of this disclosure.

Referring to FIG. 9, includes a method 900 used to select a tuning algorithm based upon the plasma chamber condition, according to specific example embodiments of this disclosure. In step 902, the RF match is controlled by a first algorithm when the sum of the process chamber running time is less than a first time. In step 904, the RF match is controlled by a second algorithm when the sum of the running time is more than the first running time but less than a second time. In step 906, the RF match is controlled by a third algorithm when the sum of the running time is more than the second time. In one embodiment, the first, second and third algorithms are configured to adjust for a drift in one or more of the plasma processing variables over time. In one example, the capacitance of at least one of the three variable capacitors VC1, VC2 and VC3 in the RF tuning circuit 112 is serially increased or decreased by the adjustment of the variable capacitor settings provided by each of the first, second and third algorithms.

FIG. 10 illustrates a method 1000 that allows the tool controller to decide which of the stored match algorithms should be run during different substrate manufacturing process applications in different plasma processing chambers, according to an embodiment of this disclosure. In step 1002, a first RF match algorithm is programmed into and used by a match controller when used with a first plasma chamber. In step 1004, a second RF match algorithm is programmed into and used by the match controller when used with a second plasma chamber. The first and second plasma chambers may be running different process applications that require different tuning algorithms.

The present disclosure has been described in terms of one or more embodiments, and it should be appreciated that many equivalents, alternatives, variations, and modifications, aside from those expressly stated, are possible and within the scope of the disclosure.

What is claimed is:

1. A system for controlling plasma generation in a plasma processing chamber, comprising:

an impedance matching network comprising:

a first node adapted for coupling to a radio frequency (RF) power generator, a second node adapted for coupling to an electrode within the plasma processing chamber, and adjustable tuning elements for transforming at least one of a plurality of impedances at the second node to an output impedance of the RF power generator at the first node;

a tool controller, which is in communication with a match controller, stores a plurality of tuning algorithms and instructions in a tool controller memory, which when the instructions are executed by a processor of the tool controller cause a sequence of process recipe steps to be performed in the plasma processing chamber, and the tool controller is operable to transfer one of the plurality of tuning algorithms to a match controller memory while at least one process step is performed; and the match controller coupled to the adjustable tuning elements of the impedance matching network, wherein the match controller controls a setting of at least one of the adjustable tuning elements of the impedance matching network by use of at least one of the plurality of tuning algorithms stored in the match controller memory, wherein the sequence of a plurality of process recipe steps comprise:

a first process recipe step, which when executed by the processor, causes at least one process variable to be adjusted to a first setting, and causes a first tuning algorithm of the plurality of tuning algorithms to be executed by the match controller, wherein the execution of the first tuning algorithm causes the at least one of the adjustable tuning elements to be set to a first impedance setting;

determining, by the tool controller, a second tuning algorithm of the plurality of tuning algorithms based on historical data including performance data of at least the first process recipe step, wherein the second tuning algorithm is distinct from the first tuning algorithm and is configured to cause the at least one of the adjustable tuning elements to be set to a second impedance setting; and a second process recipe step, which when executed by the processor, causes the at least one process variable to be adjusted to a second setting, and causes the second tuning algorithm to be executed by the match controller.

2. The system of claim 1, wherein a selection of the second tuning algorithm is based on a determination that the at least one process variable is adjusted from the first setting to the second setting.

3. The system of claim 1, wherein the second tuning algorithm is transferred from the tool controller memory to the match controller memory.

4. The system of claim 1, wherein the match controller memory is operable to make adjustments on the nanosecond time scale.

5. The system of claim 1, wherein the at least one process variable includes a change in a characteristic of a DC voltage pulse applied to an electrode within the plasma processing chamber by a DC voltage pulse generator.

6. The system of claim 5, wherein the change in the characteristic of the DC voltage pulse applied to the electrode comprises an initiation of the delivery of the DC voltage pulse.

7. The system of claim 1, wherein the process of setting the first impedance setting performed during the execution of the first tuning algorithm comprises adjusting a set point of at least one of the adjustable tuning elements and a rate at which the set point is adjusted.

8. The system of claim 1, wherein a speed with which the altered tuning algorithm reacts to a change in a detected amount of reflected power is set within each modified tuning algorithm.

9. The system of claim 1, wherein an adjustment of a set point of a plurality of variable tuning elements is controlled by the tuning algorithm to adjust for real time variations in a plasma generated in the plasma processing chamber.

10. The system of claim 1, wherein a weighting parameter or a correction parameter is developed to optimize a tuning gain, tuning matrix, or combinations thereof based on a plurality of previous process steps or previous process runs.

11. The system of claim 1, wherein the historical data comprises reflected power and tuning speeds.

12. A method for processing a substrate in a plasma processing chamber, comprising:

storing a process recipe in a tool controller, the process recipe comprising a first process recipe step and a second process recipe step;

implementing the first process recipe step, wherein implementing the first process recipe step comprises:

executing, by use of a match controller, a first tuning algorithm, wherein executing the first tuning algorithm comprises adjusting at least one adjustable tuning element of an impedance matching network to at least a first impedance setting, and the impedance matching network comprises:

a first node adapted for coupling to a radio frequency (RF) power generator, a second node adapted for coupling to an electrode within the plasma processing chamber, and the at least one adjustable tuning element; and delivering, by use of the impedance matching network, RF power to an electrode disposed within the plasma processing chamber, wherein the delivery of RF power is provided while the first tuning algorithm is being executed by the match controller, and causes gases disposed within the plasma processing chamber to form or maintain a plasma that has a first load impedance;

developing a weighting parameter or a correction parameter to optimize a tuning gain, tuning matrix, or combinations thereof based on historical data of previous process steps or process runs;

updating a match tuning performance of a second tuning algorithm in real time based upon the historical data and the weighting parameter or correction parameter; and implementing the second process recipe step, wherein implementing the second process recipe step comprises:

executing, by use of the match controller, the second tuning algorithm, wherein executing the second tuning algorithm comprises setting the at least one adjustable tuning element to at least a second impedance setting;

continuing to deliver, by use of the impedance matching network, RF power to the electrode disposed within the plasma processing chamber; and adjusting at least one plasma processing variable that causes the first load impedance to change to a second load impedance, wherein the continued delivery of RF power is provided while the second tuning algorithm is being executed by the match controller, and the second tuning algorithm is executed based on the adjusted at least one plasma processing variable.

13. The method of claim 12, wherein the delivery of RF power provided while the first tuning algorithm is being executed causes the gases disposed within the plasma processing chamber to form the plasma.

14. The method of claim 13, wherein executing the second tuning algorithm comprises replacing the first tuning algorithm with the second tuning algorithm in a match controller memory.

15. The method of claim 14, further comprising uploading, during post process steps, a third tuning algorithm for controlling the at least one of the adjustable tuning elements of the impedance matching network for running cleaning recipe process steps.

16. The method of claim 14, wherein replacing the first tuning algorithm with the second tuning algorithm in the match controller memory comprises accessing historical match tuning process data of a tuning algorithm stored in a tool controller memory.

17. The method of claim 12, further comprising optimizing tuning element adjustment speeds with a weighting parameter stored in the tool controller memory and based upon the historical data.

18. The method of claim 12, wherein the first tuning algorithm and the second tuning algorithm are configured to adjust for a drift in at least one plasma processing variable overtime.

19. An impedance matching network adapted for coupling between an RF power generator and a plasma processing chamber, comprising:

a first node adapted for coupling to the RF power generator;

a second node adapted for coupling to an electrode within the plasma processing chamber, and adjustable tuning elements for transforming at least one of a plurality of impedances at the second node to an output impedance of the RF power generator at the first node; and a match controller coupled to the adjustable tuning elements, wherein the match controller controls setting an impedance transformation with at least one of the adjustable tuning elements by use of at least one of a plurality of tuning algorithms stored in a match controller memory;

a tool controller having a memory for storing the plurality of tuning algorithms, the tool controller is operable to update a match performance of the plurality of tuning algorithms in real time for use during a process recipe step based upon historical data comprising reflected power and tuning speeds from at least one previous process recipe or step, and an adjustment of a set point of a plurality of variable tuning elements is controlled by the tuning algorithm to adjust for real time variations in a plasma generated in the plasma processing chamber; and a communications device between the tool controller and the match controller for transferring tuning algorithms between the tool controller and match controller memories.

* * * * *